(12) United States Patent
Isojima et al.

(10) Patent No.: US 11,605,833 B2
(45) Date of Patent: Mar. 14, 2023

(54) SOLID ELECTROLYTE COMPOSITION AND METHOD OF MANUFACTURING THE SAME, SOLID ELECTROLYTE-CONTAINING SHEET, ELECTRODE SHEET FOR ALL-SOLID STATE SECONDARY BATTERY, AND METHOD OF MANUFACTURING ALL-SOLID STATE SECONDARY BATTERY

(71) Applicant: FUJIFILM Corporation, Tokyo (JP)

(72) Inventors: Hiroshi Isojima, Kanagawa (JP); Shin Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 162 days.

(21) Appl. No.: 16/935,182

(22) Filed: Jul. 21, 2020

(65) Prior Publication Data

US 2020/0350628 A1 Nov. 5, 2020

Related U.S. Application Data

(63) Continuation of application No. PCT/JP2019/003298, filed on Jan. 31, 2019.

(30) Foreign Application Priority Data

Feb. 5, 2018 (JP) .............. JP2018-018676
May 23, 2018 (JP) .............. JP2018-098992

(51) Int. Cl.
*H01M 10/0562* (2010.01)
*H01M 4/139* (2010.01)
*H01M 4/62* (2006.01)

(52) U.S. Cl.
CPC ....... *H01M 10/0562* (2013.01); *H01M 4/139* (2013.01); *H01M 4/62* (2013.01); *H01M 2300/0068* (2013.01)

(58) Field of Classification Search
None
See application file for complete search history.

(56) References Cited

U.S. PATENT DOCUMENTS

| | | |
|---|---|---|
| 9,236,158 B2 | 1/2016 | Kubo et al. |
| 10,424,778 B2 | 9/2019 | Mochizuki et al. |
| 10,693,190 B2 | 6/2020 | Mochizuki et al. |
| 2014/0166930 A1 | 6/2014 | Hamamoto et al. |
| 2015/0372347 A1 | 12/2015 | Hamamoto et al. |
| 2016/0164136 A1 | 6/2016 | Higuchi et al. |
| 2016/0204465 A1 | 7/2016 | Mimura et al. |
| 2018/0083307 A1* | 3/2018 | Makino .............. H01M 10/056 |
| 2018/0277891 A1* | 9/2018 | Mimura .............. H01M 10/058 |

FOREIGN PATENT DOCUMENTS

| | | |
|---|---|---|
| CN | 105210154 | 12/2015 |
| CN | 105580187 | 5/2016 |
| CN | 106328992 | 1/2017 |
| EP | 3389129 | 10/2018 |
| JP | 2012199003 | 10/2012 |
| JP | 2012212652 | 11/2012 |
| JP | 2016139511 | 8/2016 |
| JP | 2016212990 | 12/2016 |
| JP | 2017157305 | 9/2017 |
| JP | 2018152197 | 9/2018 |
| WO | 2013024724 | 2/2013 |
| WO | 2014051032 | 4/2014 |
| WO | 2016194759 | 12/2016 |
| WO | WO 2016/199805 | * 12/2016 |
| WO | 2017099248 | 6/2017 |
| WO | 2017104405 | 6/2017 |

OTHER PUBLICATIONS

Ishihara, T.; Sato, K.; Takita, Y.- Electrophoretic Deposition of Y2O3-Stabilized ZrO2 Electrolyte Films in Solid Oxide Fuel Cells, J. Am. Ceram. Soc., 79(4), pp. 913-919, 1996 (Year: 1996).*
Machine translation of CN 106328992A, published in Jan. 11, 2017 (Year: 2017).*
Jonas Gurauskis, "Deposition Via Dip Coating Technique of Dense Yttrium Stabilized Zirconia Layers." International Journal of Applied Ceramic Technology, vol. 10, No. 1, Jun. 20, 2012, pp. 79-86.
"Search Report of Europe Counterpart Application", dated Feb. 22, 2021, p. 1-p. 10.
"Office Action of Korea Counterpart Application" with English translation thereof, dated Dec. 13, 2021, p. 1-p. 13.
"Office Action of Japan Counterpart Application" with English translation thereof, dated Apr. 27, 2021, p. 1-p. 6.
"International Search Report (Form PCT/ISA/210) of PCT/JP2019/003298," dated Apr. 2, 2019, with English translation thereof, pp. 1-4.
"Written Opinion of the International Searching Authority (Form PCT/ISA/237) of PPCT/JP2019/003298," dated Apr. 2, 2019, with English translation thereof, pp. 1-9.
"Office Action of China Counterpart Application", dated Oct. 18, 2022, with English translation thereof, pp. 1-17.

* cited by examiner

*Primary Examiner* — Anca Eoff
(74) *Attorney, Agent, or Firm* — JCIPRNET

(57) ABSTRACT

Provided are a solid electrolyte composition including an inorganic solid electrolyte and a dispersion medium (A), in which the dispersion medium (A) includes a ketone compound (A1), and at least one dispersant (A2) selected from a ketone compound (A2-1) having a chemical structure different from the ketone compound (A1) or a alcohol compound (A2-2) and a method of manufacturing the same, a solid electrolyte-containing sheet, an electrode sheet for an all-solid state secondary battery, and a method of manufacturing an all-solid state secondary battery.

19 Claims, 1 Drawing Sheet

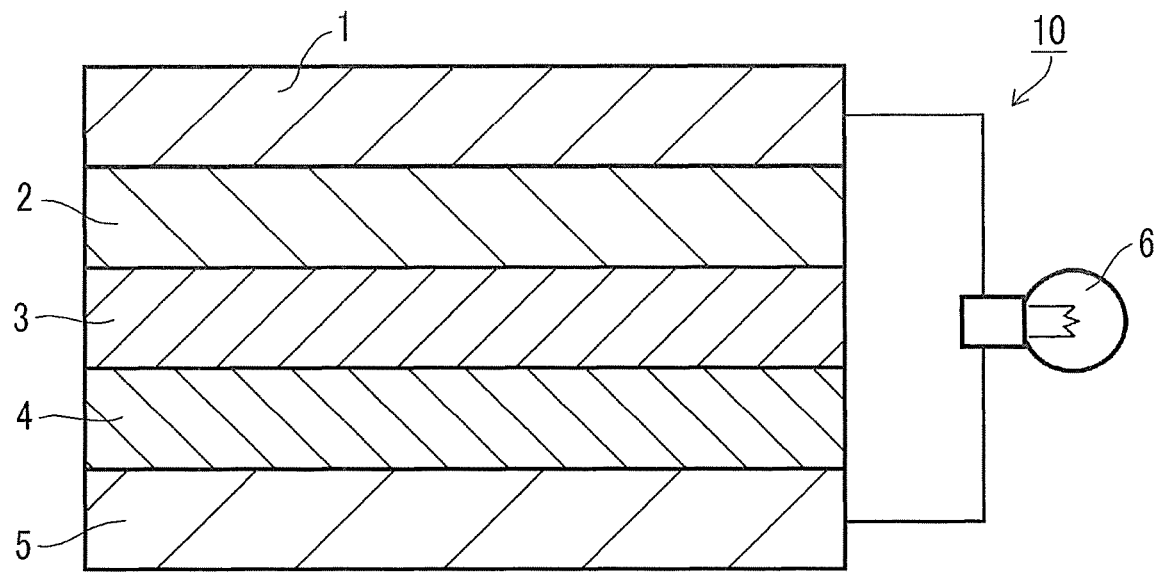

SOLID ELECTROLYTE COMPOSITION AND METHOD OF MANUFACTURING THE SAME, SOLID ELECTROLYTE-CONTAINING SHEET, ELECTRODE SHEET FOR ALL-SOLID STATE SECONDARY BATTERY, AND METHOD OF MANUFACTURING ALL-SOLID STATE SECONDARY BATTERY

CROSS-REFERENCE TO RELATED APPLICATIONS

This application is a Continuation of PCT International Application No. PCT/JP2019/003298 filed on Jan. 31, 2019, which claims priority under 35 U.S.C. § 119 (a) to Japanese Patent Application No. 2018-018676 filed in Japan on Feb. 5, 2018 and Japanese Patent Application No. 2018-098992 filed in Japan on May 23, 2018. Each of the above applications is hereby expressly incorporated by reference, in its entirety, into the present application.

BACKGROUND OF THE INVENTION

1. Field of the Invention

The present invention relates to a solid electrolyte composition and a method of manufacturing the same, a solid electrolyte-containing sheet, an electrode sheet for an all-solid state secondary battery, and a method of manufacturing an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by reciprocal migration of lithium ions between both electrodes. In the related art, an organic electrolyte has been used in a lithium ion secondary battery as an electrolyte. However, the organic electrolyte is likely to leak, and a short circuit may occur in the battery due to over-charging or over-discharging so as to cause ignition. Therefore, further improvement in safety and reliability is required.

Under such circumstances, an all-solid state secondary battery formed of a solid electrolyte instead of an organic electrolyte has attracted attention. The negative electrode, the electrolyte, and the positive electrode of the all-solid state secondary battery are all made of solid, and thus safety or reliability that is a problem of a battery formed of an organic electrolyte can be greatly improved.

From the above advantages, research and development of an all-solid state secondary battery as a next-generation lithium ion battery is progressing, and materials for forming a layer constituting the all-solid state secondary battery are also being studied. An example thereof includes a composition (slurry) for forming a solid electrolyte layer of an all-solid state secondary battery or an electrode active material layer constituting an electrode (a negative electrode and a positive electrode). A slurry for forming the solid electrolyte layer is generally obtained by dispersing an inorganic solid electrolyte as an essential component for forming the layer and further a binder or the like, appropriately using various dispersants. A slurry for forming the electrode active material layer is obtained by further dispersing an active material and the like in addition to the inorganic solid electrolyte (WO2014/051032A, JP2012-212652A, and JP2016-139511A).

SUMMARY OF THE INVENTION

In the above described composition, dispersion stability of a dispersoid (maintaining properties of a stable dispersion state) is an important index for characteristics of a battery or stability during the manufacture. Since a dispersant of an inorganic solid electrolyte prevents a surface of the inorganic solid electrolyte from being deteriorated and decomposed, a dispersant having a low water content ratio or non-aqueous dispersant, a non-polar or low-polarity dispersant, or the like is generally used. However, there is room for improvement in stably dispersing solid electrolyte compositions while suppressing deterioration and decomposition of the solid electrolyte.

Among the solid electrolyte compositions, a conductive auxiliary agent is often used as a composition for forming a positive electrode active material layer. The conductive auxiliary agent generally has a higher hydrophobicity than an inorganic solid electrolyte and an active material, and has a different dispersion behavior to the dispersant from the inorganic solid electrolyte and the active material. Therefore, in the composition containing the conductive auxiliary agent, it is further difficult that the inorganic solid electrolyte, the active material, and the conductive auxiliary agent each are dispersed with good dispersibility (without aggregation) in the above described dispersant while suppressing deterioration and decomposition of the inorganic solid electrolyte. In the composition, in a case where any one of the inorganic solid electrolyte, the active material, and the conductive auxiliary agent has insufficient dispersibility, conductivity of the electrode active material layer to be formed is reduced, and thus an all-solid state secondary battery exhibiting a high battery capacity cannot be manufactured. Particularly, since a carbon material suitably used as a conductive auxiliary agent is likely to agglomerate, there is room for further improvement in dispersibility of a composition containing a carbon material as a conductive auxiliary agent.

An object of the present invention is to provide a solid electrolyte composition that is used as a material for forming a solid electrolyte layer of an all-solid state secondary battery and that is capable of manufacturing an all-solid state secondary battery exhibiting excellent battery capacity, and a suitable manufacturing method thereof. Another object of the present invention is to provide a solid electrolyte-containing sheet having a layer formed of the solid electrolyte composition. Still another object of the present invention is to provide an electrode sheet for an all-solid state secondary battery using the solid electrolyte composition and a method of manufacturing an all-solid state secondary battery.

The present inventors have conducted various studies, and as a result, found that a dispersion medium containing at least one compound selected from a ketone compound having a different chemical structure from a ketone compound as a dispersant or an alcohol compound, preferably with a specific content ratio, improves dispersion stability without deterioration and decomposition of an inorganic solid electrolyte. As a result of conducting further studies, the present inventors have found that not only the inorganic solid electrolyte but also an active material and a conductive auxiliary agent (a carbon material) can be highly dispersed while suppressing aggregation thereof. Furthermore, the present inventors have found that an all-solid state secondary battery produced by a solid electrolyte composition containing the above dispersion medium in combination with an inorganic solid electrolyte or the like has excellent battery capacity. The present invention was completed by repeating additional studies on the basis of the above described finding.

That is, the above described objects have been achieved by the following means.

<1> A solid electrolyte composition comprising: an inorganic solid electrolyte; and a dispersion medium (A), in which the dispersion medium (A) includes a ketone compound (A1), and at least one dispersant (A2) selected from a ketone compound (A2-1) having a chemical structure different from the ketone compound (A1) or an alcohol compound (A2-2).

<2> The solid electrolyte composition according to <1>, further comprising an active material.

<3> The solid electrolyte composition according to <1> or <2>, further comprising a conductive auxiliary agent.

<4> The solid electrolyte composition according to any one of <1> to <3>, in which a content ratio of the dispersant (A2) in the dispersion medium (A) is more than 0% by mass and less than 50% by mass.

<5> The solid electrolyte composition according to any one of <1> to <4>, in which the ketone compound (A1) has 6 or more carbon atoms, and the ketone compound (A2-1) has 4 or more carbon atoms.

<6> The solid electrolyte composition according to any one of <1> to <5>, in which the ketone compound (A2-1) has 6 or more carbon atoms.

<7> The solid electrolyte composition according to any one of <1> to <6>, in which the ketone compound (A2-1) has 9 or more carbon atoms.

<8> The solid electrolyte composition according to any one of <1> to <7>, in which at least one dispersant (A2) is a structural isomer of the ketone compound (A1).

<9> The solid electrolyte composition according to any one of <1> to <8>, in which the dispersion medium (A) includes at least one non-polar dispersant.

<10> The solid electrolyte composition according to any one of <1> to <9>, in which a median diameter of an active material is larger than a median diameter of the inorganic solid electrolyte.

<11> A solid electrolyte-containing sheet having a layer formed of the solid electrolyte composition according to any one of <1> to <10>.

<12> A method of manufacturing a solid electrolyte composition comprising: a step of dispersing an inorganic solid electrolyte in a dispersion medium (A), in which the dispersion medium (A) includes a ketone compound (A1), and at least one dispersant (A2) selected from a ketone compound (A2-1) having a chemical structure different from the ketone compound (A1) or an alcohol compound (A2-2).

<13> The method of manufacturing a solid electrolyte composition according to <12>, in which a content ratio of the dispersant (A2) in the dispersion medium (A) is more than 0% by mass and less than 50% by mass.

<14> The method of manufacturing a solid electrolyte composition according to <12> or <13>, in which the ketone compound (A1) has 6 or more carbon atoms, and the ketone compound (A2-1) has 4 or more carbon atoms.

<15> The method of manufacturing a solid electrolyte composition according to any one of <12> to <14>, in which the ketone compound (A2-1) has 6 or more carbon atoms.

<16> The method of manufacturing a solid electrolyte composition according to any one of <12> to <15>, in which the ketone compound (A2-1) has 9 or more carbon atoms.

<17> The method of manufacturing a solid electrolyte composition according to any one of <12> to <16>, in which at least one dispersant (A2) is a structural isomer of the ketone compound (A1).

<18> The method of manufacturing a solid electrolyte composition according to any one of <12> to <17>, in which the dispersion medium (A) includes at least one non-polar dispersant.

<19> The method of manufacturing a solid electrolyte composition according to any one of <12> to <18>, further comprising a step of mixing an active material and a preliminary dispersion obtained after the dispersing step.

<20> The method of manufacturing a solid electrolyte composition according to <19>, in which the mixing step is a step of mixing the preliminary dispersion, the active material, and a conductive auxiliary agent.

<21> A method of manufacturing an electrode sheet for an all-solid state secondary battery through the method of manufacturing a solid electrolyte composition according to any one of <12> to <20>.

<22> A method of manufacturing an all-solid state secondary battery through the method of manufacturing a solid electrolyte composition according to any one of <12> to <20>.

<23> The method of manufacturing an all-solid state secondary battery according to <22>, in which a solid electrolyte composition and a solid electrolyte composition containing an active material are simultaneously applied for multi-layer coating to form a solid electrolyte layer and an active material layer, and at least one of the solid electrolyte composition or the solid electrolyte composition containing the active material is manufactured by the method of manufacturing a solid electrolyte composition according to any one of <12> to <20>.

The present invention can provide a solid electrolyte composition that is used as a material for forming a solid electrolyte-containing layer of an all-solid state secondary battery and that is capable of manufacturing an all-solid state secondary battery exhibiting excellent battery capacity, and a suitable manufacturing method thereof. In addition, the present invention can provide a solid electrolyte-containing sheet having a layer formed of the solid electrolyte composition. Furthermore, the present invention can provide an electrode sheet for an all-solid state secondary battery using the solid electrolyte-containing composition and a method of manufacturing an all-solid state secondary battery.

The above described and other characteristics and advantages of the present invention will be further clarified by the following description with reference to appropriately accompanied drawings.

BRIEF DESCRIPTION OF THE DRAWINGS

The FIGURE is a longitudinal cross-sectional view schematically illustrating an all-solid state secondary battery according to a preferred embodiment of the present invention.

DESCRIPTION OF THE PREFERRED EMBODIMENTS

In the description of the present invention, numerical ranges expressed using "to" include numerical values before and after the "to" as the lower limit value and the upper limit value.

[Solid Electrolyte Composition]

A solid electrolyte composition of the present invention includes an inorganic solid electrolyte and a dispersion medium (A).

The dispersion medium (A) of the present invention contained in the solid electrolyte composition includes a ketone compound (A1) as a dispersant, and at least one dispersant (A2) selected from a ketone compound (A2-1) having a chemical structure different from the ketone compound (A1) or an alcohol compound (A2-2).

This solid electrolyte composition is, as described later, in a dispersion state (a suspension state) in which the inorganic solid electrolyte is dispersed in the dispersion medium (A) in a solid state. The solid electrolyte composition may be in such a dispersion state, and is preferably a slurry.

The solid electrolyte composition of the present invention may contain the ketone compound (A1) and at least one dispersant (A2) as the dispersion medium (A), and a state of containing the ketone compound (A1) and the dispersant (A2) is not particularly limited. In the present invention, generally, it is preferable that the ketone compound (A1) and the dispersant (A2) are contained in a mixed state or a mixed state without phase separation.

In a case where the solid electrolyte composition of an embodiment of the present invention contains the dispersion medium (A) as a dispersion medium, the inorganic solid electrolyte can be dispersed while suppressing deterioration, decomposition, and the like of the inorganic solid electrolyte. Although the details of the reason are not yet clear, it can be considered as follows.

A carbonyl group in the ketone compound constituting the dispersion medium (A) is a polar group. Therefore, the carbonyl group can be adsorbed on a surface of the inorganic solid electrolyte to improve dispersibility thereof. On the other hand, a ketone compound may generally cause a surface of the inorganic solid electrolyte surface to be deteriorated or decomposed by reacting with the inorganic solid electrolyte having high reactivity. In this case, dispersibility deteriorates due to (re)aggregation of a dispersoid.

However, the dispersion medium used in the present invention includes at least two different ketone compounds different from each other or a ketone compound and an alcohol compound, preferably with a specific content ratio. Therefore, it is considered that a reaction with the inorganic solid electrolyte is suppressed while increasing an adsorption capacity to the inorganic solid electrolyte, deterioration, decomposition, and the like can be suppressed, and a stable dispersion state can be maintained (excellent in dispersion stability).

The solid electrolyte composition according to the embodiment of the present invention also includes an aspect containing an active material and a conductive auxiliary agent as a dispersoid in addition to the inorganic solid electrolyte (the composition of this aspect is referred to as an electrode layer composition).

In a case where the electrode layer composition of the present invention contains the dispersion medium (A) as a dispersion medium, any of the inorganic solid electrolyte, the active material, and the conductive auxiliary agent can be dispersed while suppressing deterioration, decomposition, and the like of the inorganic solid electrolyte. Although the details of the reason are not yet clear, it can be considered as follows.

Generally, the ketone compound does not exhibit good dispersibility in the conductive auxiliary agent that is more hydrophobic than the inorganic solid electrolyte and the active material. However, the above described at least two compounds contained in the dispersion medium (A) used in the present invention have different degrees of chemical or physical interaction with respect to the conductive auxiliary agent. Thus, the at least two compounds can increase the dispersibility of the conductive auxiliary agent, particularly the carbon material, as the entire dispersion medium, and suppress re-agglomeration of the dispersoid in the electrode layer composition (the inorganic solid electrolyte, the active material, the conductive auxiliary agent, and the like), particularly the carbon material to exhibit high dispersibility (dispersion stability) with respect to the dispersoid. As described above, the dispersion medium (A) used in the present invention can disperse any of the inorganic solid electrolyte and the active material, and the conductive auxiliary agent that is more hydrophobic than the inorganic solid electrolyte and the active material while suppressing deterioration or decomposition of the inorganic solid electrolyte.

Furthermore, the solid electrolyte composition of the present invention can form a solid electrolyte layer of a solid electrolyte-containing sheet (an electrode sheet for an all-solid state secondary battery (simply, referred to as an "electrode sheet") or an electrode active material layer of an all-solid state secondary battery) while maintaining the dispersoid to be in a highly dispersion state. In the solid electrolyte-containing sheet or the solid electrolyte layer formed with the solid electrolyte composition according to the embodiment of the present invention, the dispersoid is highly dispersed, and a higher degree of battery capacity (a discharge capacity) can be imparted to the all-solid state secondary battery. Although the details of the reason are not yet clear, it can be considered as follows.

Generally, in a case where a solid electrolyte-containing sheet is formed using a solid electrolyte composition, viscosity of the solid electrolyte composition, further an evaporation rate of the dispersant during the application and/or drying of the solid electrolyte composition, and the like affect layer forming ability for the solid electrolyte-containing sheet and the solid electrolyte layer or the battery capacity. That is, in a case where the evaporation rate of the dispersant is too high, the dispersant starts to evaporate (dry) even during the application, so that a solid electrolyte-containing sheet and the like cannot be uniformly formed due to re-agglomeration of the dispersoid. On the other hand, in a case where the evaporation rate is too low, precipitation of the dispersoid occurs before the dispersant evaporates (dry), and thus a solid electrolyte-containing sheet and the like cannot be uniformly formed. Furthermore, in a case where the viscosity of the solid electrolyte composition is too low, a coating film of the solid electrolyte composition flows and spreads, and thus a solid electrolyte-containing sheet and the like having a sufficient thickness cannot be formed. On the other hand, in a case where the viscosity is too high, the solid electrolyte composition is not formed in a sheet or layer shape and becomes solidified. As described above, since the layer-forming ability deteriorates, a solid electrolyte-containing sheet and the like exhibiting desired characteristics (the conductivity and the battery capacity) cannot be formed.

However, the solid electrolyte composition according to the embodiment of the present invention preferably contains the above described dispersion medium (A) including a specific amount of the dispersant (A2) with respect to the ketone compound (A1). Therefore, the solid electrolyte composition is considered to be capable of realizing the evaporation rate and viscosity required for forming the solid electrolyte-containing sheet and the like. In addition, the solid electrolyte composition can effectively prevent the re-agglomeration and precipitation of the dispersoid and form a solid electrolyte-containing sheet and the like while maintaining high dispersibility of the dispersoid in the solid electrolyte composition. Thereby, desired characteristics can be realized. For example, in an electrode sheet and an electrode active material layer formed using the electrode layer composition of the present invention, it is considered that a conductive path is densely constructed. As a result, by using the solid electrolyte composition of the present invention, the discharge capacity of the all-solid state secondary battery can be improved to the higher level.

The solid electrolyte composition according to the embodiment of the present invention is a non-aqueous composition. In a case where the solid electrolyte composition is a non-aqueous composition, deterioration or decomposition of the inorganic solid electrolyte can be suppressed and high ion conductivity can be maintained. In the present invention, the non-aqueous composition includes, in addition to an aspect containing no water, a form having an water content ratio (referred to as an water content amount) of 50 ppm or less. In the non-aqueous composition, an water content ratio is preferably 20 ppm or less, more preferably 10 ppm or less, and even more preferably 5 ppm or less. An water content amount indicates an amount of water (a mass ratio of the solid electrolyte composition) contained in the solid electrolyte composition. The water content amount can be determined by filtering the solid electrolyte composition through a 0.02 μm membrane filter and Karl Fischer titration.

Hereinafter, components contained in the solid electrolyte composition according to the embodiment of the present invention and components that may be contained will be described.

<Inorganic Solid Electrolyte>

The inorganic solid electrolyte used in the present invention includes ion conductivity of metals belonging to Group I or II of the periodic table. As the inorganic solid electrolyte, it is possible to appropriately select and use solid electrolyte materials that are applied to these kinds of products. Examples of the inorganic solid electrolyte include (i) sulfide-based inorganic solid electrolytes, (ii) oxide-based inorganic solid electrolytes, (iii) halide-based inorganic solid electrolytes, and (iv) hydride-based inorganic solid electrolytes, and sulfide-based inorganic solid electrolytes are preferable from the viewpoints of high ion conductivity and ease of interface bonding between particles.

In a case where the all-solid state secondary battery of the present invention is an all-solid state lithium ion secondary battery, the inorganic solid electrolyte preferably has ion conductivity of lithium ions.

(i) Sulfide-Based Inorganic Solid Electrolytes

In the present invention, the term "sulfide-based inorganic solid electrolyte" refers to sulfide-based inorganic solid electrolytes having inorganic properties, and the solid electrolyte refers to a solid-state electrolyte capable of migrating ions therein. The inorganic solid electrolyte is clearly differentiated from organic solid electrolytes (high-molecular-weight electrolytes represented by polyethylene oxide (PEO) or the like and organic electrolyte salts represented by lithium bis(trifluoromethanesulfonyl)imide (LiTFSI)) since the inorganic solid electrolyte does not include any organic substances as a principal ion conductive material. In addition, the inorganic solid electrolyte is a solid in a static state, and thus, generally is not disassociated or liberated into cations and anions. Due to this fact, the inorganic solid electrolyte is also clearly differentiated from inorganic electrolyte salts of which cations and anions are disassociated or liberated in electrolytic solutions or polymers (LiPF$_6$, LiBF$_4$, LiFSI, LiCl, and the like). The inorganic solid electrolyte is not particularly limited as long as the inorganic solid electrolyte has ion conductivity of metals belonging to Group I or II of the periodic table and is generally a substance not having electron conductivity.

In the present invention, as the inorganic solid electrolyte, it is possible to appropriately select and use sulfide-based inorganic solid electrolyte materials that are applied to these kinds of products.

In a case of manufacturing the all-solid lithium ion secondary battery using the solid electrolyte composition of the present invention, sulfide-based inorganic solid electrolytes having ion conductivity of lithium ions are used.

The sulfide-based inorganic solid electrolytes are preferably compounds which contain sulfur atoms (S), have ion conductivity of metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples of the sulfide-based inorganic solid electrolytes include lithium ion conductive sulfide-based inorganic solid electrolytes satisfying a composition represented by Formula (I).

$$L_{a1}M_{b1}P_{c1}S_{d1}A_{e1} \qquad \text{Formula (I)}$$

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements be controlled by adjusting the ratios of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two or more raw materials of, for example, lithium sulfide (Li$_2$S), phosphorus sulfide (for example, diphosphorus pentasulfide (P$_2$S$_5$)), a phosphorus single body, a sulfur single body, sodium sulfide, hydrogen sulfide, lithium halides (for example, LiI, LiBr, and LiCl), or sulfides of an element represented by M (for example, SiS$_2$, SnS, and GeS$_2$).

The ratio between Li$_2$S and P$_2$S$_5$ in Li—P—S-based glass and Li—P—S-based glass ceramic is preferably 60:40 to 90:10 and more preferably 68:32 to 78:22 in terms of the molar ratio between Li$_2$S:P$_2$S$_5$. In a case in which the ratio between Li$_2$S and P$_2$S$_5$ is set in the above described range, it is possible to increase the lithium ion conductivity. Specifically, the lithium ion conductivity can be preferably set to $1 \times 10^{-4}$ S/cm. or more and more preferably set to $1 \times 10^{-3}$ S/cm or more. The upper limit is not particularly limited, but realistically $1 \times 10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Mixing ratios of the respective raw materials do not matter. Examples of a method of synthesizing sulfide-based inorganic solid electrolyte materials using the above described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolytes

Oxide-based inorganic solid electrolytes are preferably compounds which contain oxygen atoms (O), have ion conductivity of metals belonging to Group I or II of the periodic table, and have electron-insulating properties.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}_{mb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}_{zc}O_{nc}$ ($M^{cc}$ is at least one element of C, S, Al, Si, Ga, Ge, In, or Sn, xc satisfies 0<xc≤5, yc satisfies 0<yc≤1, zc satisfies 0≤zc≤1, and nc satisfies 0<nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}_{xe}D^{ee}O$ (xe represents a number of 0 or more and 0.1 or less, and $M^{ee}$ represents a divalent metal atom. $D^{ee}$ represents a halogen atom or a combination of two or more halogen atoms.), $Li_{xf}Si_{yf}O_{zf}$ (1≤xf≤5, 0<yf≤3, 1≤zf≤10), $Li_{xg}Si_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$), LiPON in which some of oxygen atoms in lithium phosphate are substituted with nitrogen, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like), and the like. It is also possible to preferably use $LiA^1ON$ ($A^1$ represents at least one element selected from Si, B, Ge, Al, C, Ga, or the like) and the like.

(iii) Halide-Based Inorganic Solid Electrolytes

Halide-based inorganic solid electrolytes are preferably compounds which contain halogen atoms, have ion conductivity of metals belonging to Group I or II of the periodic table, and have electron-insulating properties.

The halide-based inorganic solid electrolytes are not particularly limited, and examples thereof include compounds such as LiCl, LiBr, LiI, and $Li_3YBr_6$ and $Li_3YCl_6$ described in ADVANCED MATERIALS, 2018, 30, 1803075. Among these, $Li_3YBr_6$ and $Li_3YCl_6$ are preferable.

(iv) Hydride-Based Inorganic Solid Electrolytes

Hydride-based inorganic solid electrolytes are preferably compounds which contain hydrogen atoms, have ion conductivity of metals belonging to Group I or II of the periodic table, and have electron-insulating properties.

The hydride-based inorganic solid electrolytes are not particularly limited, and examples thereof include $LiBH_4$, $Li_4(BH_4)_3I$, $3LiBH_4$—LiCl, and the like.

The inorganic solid electrolyte preferably has a particle form. In this case, the median diameter D50 of the inorganic solid electrolyte is not particularly limited, but is preferably smaller than a median diameter of the active material described later. The median diameter is, for example, preferably 0.01 μm or more, and more preferably 0.1 μm or more. The upper limit is preferably 100 μm or less and more preferably 5 μm or less. Since in the present invention, a specific dispersion medium described later is used, re-agglomeration or precipitation of the inorganic solid electrolyte and the like can be suppressed even in the solid electrolyte composition and further even during the application and/or drying of the solid electrolyte composition. Therefore, a particle diameter of the inorganic solid electrolyte can be reduced. Particularly, in a case where the active material is contained and a case of reducing the particle diameter smaller than the active material, the battery capacity of the all-solid state secondary battery can be improved. In this case, regardless of the above described upper limit, an upper limit of the particle diameter (a median diameter) of the inorganic solid electrolyte can be, for example, 10 μm, can be set to a further small diameter of 2 μm or less in a case of preliminary dispersion described later, and appropriately can be 1 μm or less.

An average particle diameter of the inorganic solid electrolyte particles is measured in the following order. The inorganic solid electrolyte particles are diluted and adjusted to 1% by mass of a dispersion liquid by using heptane in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a quartz cell for measurement at a temperature of 25° C., thereby obtaining a volume average particle diameter. Regarding other detailed conditions and the like, the description of JIS Z 8828:2013 "particle diameter analysis-Dynamic light scattering method" is referred to as necessary. Five specimens are produced and measured per level, and the average values thereof are employed.

The inorganic solid electrolyte may be used singly or two or more inorganic solid electrolytes may be used in combination.

The content amount of the inorganic solid electrolyte in the solid electrolyte composition is not particularly limited, and when considering a reduction of interface resistance when the all-solid state secondary battery is used and maintenance of the reduced interface resistance, the content amount is preferably 5% by mass or more with respect to 100% by mass of a solid component, more preferably 10% by mass or more, and particularly preferably 15% by mass. The upper limit is preferably 50% by mass or less, more preferably 40% by mass or less, and particularly preferably 30% by mass or less in view of a decrease in battery energy due to a decrease in an active material ratio in the electrode in a case where the content amount of the inorganic solid electrolyte becomes large.

In a case where the solid electrolyte composition according to the embodiment of the present invention contains an active material described later, the content amount of the inorganic solid electrolyte in the solid electrolyte composition is preferably 5% by mass or more with respect to 100% by mass of a solid component, more preferably 10% by mass or more, even more preferably 15% by mass or more, still even more preferably 50% by mass or more, particularly preferably 70% by mass or more, and most preferably 90% by mass or more as a total content amount of the inorganic solid electrolyte and the active material. The upper limit is preferably 99.9% by mass or less, more preferably 99.5% by mass or less, and particularly preferably 99% by mass or less. The content amount of the inorganic solid electrolyte alone is not particularly limited as long as the total content amount of the inorganic solid electrolyte and the active material is within the above range, and is appropriately set.

In the present invention, the term "solid content (a solid component)" refers to a component which does not disappear by volatilization or evaporation when the solid electrolyte composition is dried at 150° C. for 6 hours under a pressure of 1 mmHg and a nitrogen atmosphere. Typically, the solid content refers to components other than a dispersant described later.

<Active Material>

The solid electrolyte composition according to the embodiment of the present invention can also contain an active material. This active material is a material capable of inserting and releasing ions of a metal element belonging to Group I or II of the periodic table. Examples of such an active material include a positive electrode active material and a negative electrode active material. As the positive electrode active material, a metal oxide (preferably a transition metal oxide) is preferable, and as the negative electrode active material, a carbon material, a metal oxide, or metals capable of forming an alloy with lithium, such as Sn, Si, Al and In is preferable.

In the present invention, a solid electrolyte composition (an electrode layer composition) containing the positive electrode active material may be referred to as a positive electrode composition, and a solid electrolyte composition containing the negative electrode active material may be referred to as a negative electrode composition.

(Positive Electrode Active Material)

The positive electrode active material capable of reversibly inserting and releasing lithium ions is preferable. The materials thereof are not particularly limited as long as the materials have the above described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group I (Ia) of the metal periodic table other than lithium, an element of Group II (IIa), or an element such as Al, Ga, In, Ge, Sn, Pb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobaltate [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2LiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

In the present invention, a transition metal oxide having a (MA) layered rock salt-type structure is preferable, and LCO or NMC is more preferable.

A shape of the positive electrode active material is not particularly limited, but is preferably particulate. In this case, the median diameter D50 of the positive electrode active material is not particularly limited, but is preferably greater than a median diameter of the above described inorganic solid electrolyte from the viewpoint of an electric capacitance of the all-solid state secondary battery. For example, the median diameter of the positive electrode active material can be 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The median diameter of the positive electrode active material can be measured in the same manner as the median diameter of the inorganic solid electrolyte.

The positive electrode active material may be used singly or two or more positive electrode active materials may be used in combination.

In a case where the positive electrode active material layer is formed, the mass (mg) (basis weight) of the positive electrode active material per unit area ($cm^2$) of the positive electrode active material layer is not particularly limited. The mass can be determined appropriately according to the designed battery capacity.

The content amount of the positive electrode active material in the electrode layer composition is not particularly limited, and is preferably 10% to 95% by mass with respect to 100% by mass of a solid content, more preferably 30% to 90% by mass, even more preferably 50% to 85% by mass, and particularly preferably 55% to 80% by mass.

(Negative Electrode Active Material)

The negative electrode active material capable of reversibly inserting and releasing lithium ions is preferable. The materials thereof are not particularly limited as long as materials have the above described characteristics, and examples thereof include a carbon material, an oxide of a metal or metalloid element (including a complex oxide), elemental lithium, lithium alloy, a negative electrode active material that can be formed to an alloy with lithium (forming an alloy with lithium), or the like. Among these, from the viewpoint of reliability, a carbon material, an oxide of a metalloid element, a metal complex oxide, and elemental lithium are preferable. A negative electrode active material that can form an alloy with lithium is preferable from the viewpoint that a capacity of the all-solid state secondary battery can be increased.

A carbon material used as the negative electrode active material is a material substantially consisting of carbon. Examples thereof include petroleum pitch, carbon black such as acetylene black (AB), graphite (natural graphite and artificial graphite such as vapor-grown graphite), and carbon materials obtained by firing various synthetic resins such as a polyacrylonitrile (PAN)-based resin or a furfuryl alcohol resin. Furthermore, examples thereof also include various carbon fibers such as PAN-based carbon fiber, cellulose-based carbon fiber, pitch-based carbon fiber, vapor-grown carbon fiber, dehydrated polyvinyl alcohol (PVA)-based carbon fiber, lignin carbon fiber, glassy carbon fiber, and activated carbon fiber, mesophase microspheres, graphite whiskers, flat graphite, and the like.

These carbon materials can be classified into non-graphitizable carbon materials (also referred to as hard carbon) and graphite-based carbon materials according to the degree of graphitization. In addition, the carbon materials preferably have a surface spacing or density, and a crystallite size described in JP1987-022066A (JP-S62-022066A), JP1990-006856A (JP-H2-006856A), and JP1991-045473A (JP-H3-045473A). The carbon materials may not be a single material, but a mixture of natural graphite and artificial graphite described in JP1993-090844A (JP-H5-090844A), graphite having a coating layer described in JP1994-004516A (JP-H6-004516A), or the like may be used.

As the carbon materials, hard carbon or graphite is preferably used, and graphite is more preferably used.

The oxide of the metal or metalloid element applied as the negative electrode active material is not particularly limited as long as the oxide is an oxide capable of occluding and releasing lithium, and examples thereof include an oxide of a metal element (metal oxide), a complex oxide of a metal element or a complex oxide of a metal element and a metalloid element (collectively referred to as a metal complex oxide), and an oxide of a metalloid element (a metalloid oxide). As these oxides, amorphous oxides are preferable, and furthermore chalcogenide that is a reaction product of a metal element and an element belonging to Group XVI of the periodic table is also preferable. In the present invention, the term "metalloid element" refers to an element having an intermediate property between a metal element and a non-metalloid element, and generally includes six elements of boron, silicon, germanium, arsenic, antimony, and tellurium, and further includes three elements of selenium, polonium, and astatine. In addition, the term "amorphous" refers to oxides having a broad scattering band having a peak of a 2θ value in a range of 20° to 40° in an X-ray diffraction method in which CuKα rays are used and may have crystalline diffraction lines. The maximum intensity in the crystalline diffraction line appearing at the 2θ value of 40° to 70° is preferably 100 times or less and more preferably five times or less of the diffraction line intensity at the peak of the broad scattering line appearing at the 2θ value of 20° to 40°, and particularly preferably does not have any crystalline diffraction lines.

In a compound group consisting of the amorphous oxides and the chalcogenides, amorphous oxides of metalloid elements or chalcogenides are more preferable, and (complex) oxides consisting of one element or a combination of two or more elements selected from elements belonging to Groups XIII (IIIB) to XV (VB) of the periodic table (for example, Al, Ga, Si, Sn, Ge, Pb, Sb, and Bi) or chalcogenides are particularly preferable. Specific examples of preferable amorphous oxides and chalcogenides preferably include $Ga_2O_3$, GeO, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, GeS, PbS, $PbS_2$, $Sb_2S_3$, or $Sb_2S_5$.

Examples of the negative electrode active material that can be used in combination with an amorphous oxide negative electrode active material mainly using Sn, Si, and Ge suitably include a carbon material that can occlude and/or release lithium ion or lithium metal, elemental lithium, lithium alloy, and a negative electrode active material that can be formed to an alloy with lithium.

Oxides of metals or metalloid elements, particularly metal (complex) oxides and the above described chalcogenide, preferably contain at least one of titanium or lithium as a component from the viewpoint of high current density charge/discharge characteristics. Examples of lithium-containing metal complex oxides (lithium complex metal oxide) include complex oxides of lithium oxide and the metal (complex) oxide or chalcogenide, more specifically, $Li_2SnO_2$.

It is also preferable that a negative electrode active material, for example, metal oxides containing a titanium atom (titanium oxide). More specifically, $Li_4Ti_5O_{12}$ (lithium titanium oxide [LTO]) is preferable since the volume fluctuation during occlusion and release of lithium ions is small, and thus the high-speed charging and discharging characteristics are excellent, and deterioration of electrodes is suppressed, whereby the service lives of lithium ion secondary batteries can be improved.

The lithium alloy as the negative electrode active material is not particularly limited as long as the lithium alloy is an alloy generally used as a negative electrode active material of a secondary battery, and examples thereof include a lithium aluminum alloy.

The negative electrode active material that can form an alloy with lithium is not particularly limited as long as the negative electrode active material is generally used as a negative electrode active material of a secondary battery. Such an active material has a large expansion and contraction due to charge and discharge. Examples of such an active material include negative electrode active materials having a silicon atom or a tin atom, and respective metals such as Al, In, and the like. Negative electrode active materials having a silicon atom that achieves a higher battery capacity (silicon atom-containing active materials) are preferable, and silicon atom-containing active materials having a silicon atom content amount of 50 mol % or higher of all constituent atoms are more preferable.

Generally, electrodes containing these negative electrode active materials (Si negative electrodes containing a silicon atom-containing active materials, Sn negative electrodes containing tin atom-containing active materials, and the like) can occlude more lager Li ions than carbon negative electrodes (such as graphite and acetylene black). That is, the amount of occluded Li ions per unit mass increases. Therefore, the battery capacity can be increased. As a result, there is an advantage that the battery driving time can be extended.

Examples of the silicon atom-containing active materials include silicon materials such as Si and SiOx ($0<x\leq 1$), and furthermore, silicon-containing alloys containing titanium, vanadium, chromium, manganese, nickel, copper, lanthanum and the like (for example, $LaSi_2$, $VSi_2$, La—Si, Gd—Si, Ni—Si), or organized active materials (for example, $LaSi_2/Si$), and other examples include active materials containing silicon atoms and tin atoms such as $SnSiO_3$, $SnSiS_3$, and the like. Since SiOx itself can be used as a negative electrode active material (metalloid oxide) and generates Si by operation of an all-solid state secondary battery, SiOx can be used as a negative electrode active material that can form an alloy with lithium (a precursor material).

Examples of the negative electrode active materials having a tin atom include Sn, SnO, $SnO_2$, SnS, $SnS_2$, furthermore active materials containing the above silicon atom and tin atom, and the like. Furthermore, examples thereof may also include a complex oxide with lithium oxide, for example, $Li_2SnO_2$.

A shape of the negative electrode active material is not particularly limited, but is preferably particulate. The median diameter D50 of the negative electrode active material is not particularly limited, but is preferably larger titan a median diameter of the inorganic solid electrolyte. For example, a median diameter of the negative electrode active material is preferably 0.1 to 60 µm. In order to provide a predetermined particle diameter to the negative electrode active material, an ordinary crusher or classifier may be used. For example, a mortar, a ball mill, a sand mill, an oscillatory ball mill, a satellite ball mill, a planetary ball mill, a swirling airflow-type jet mill, a sieve, or the like is suitably used. During crushing, it is also possible to carry out wet-type crushing in which water or an organic solvent such as methanol is made to coexist. In order to provide a desired particle diameter, classification is preferably carried out. A classification method is not particularly limited, and it is possible to use a sieve, a wind power classifier, or the like. Both of dry-type classification and wet-type classification can be carried out. The median diameter of the negative electrode active material can be measured in the same manner as the median diameter of the inorganic solid electrolyte.

The chemical formulae of compounds obtained using the firing method can be calculated using an inductively coupled plasma (ICP) emission spectroscopic analysis method as a measurement method or, as a convenient method, from the mass difference of powder before and after firing.

The negative electrode active material may be used singly or two or more positive electrode active materials may be used in combination.

In a case where the negative electrode active material layer is formed, the mass (mg) (basis weight) of the negative electrode active material per unit area ($cm^2$) of the negative electrode active material layer is not particularly limited. The mass can be determined appropriately according to the designed battery capacity.

The content amount of the negative electrode active material in the electrode layer composition is not particularly limited, and is preferably 10% to 80% by mass with respect to 100% by mass of a solid content, more preferably 20% to 80% by mass.

(Coating of Active Material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, lithium niobite-based compounds, and the like, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $Li_2BO_3$, $Li_2SiO_3$, $SiO_2$, $TiO_2$, $ZrO_2$, $Al_2O_3$, $B_2O_3$, and the like.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an active light ray or an active gas (plasma or the like) before or after the coating of the surfaces.

(Conductive Auxiliary Agent)

The solid electrolyte composition according to the embodiment of the present invention can also contain a conductive auxiliary agent. The conductive auxiliary agent may include a carbon material (meaning a conductive auxiliary agent of a carbon material, also referred to as a carbon-based conductive auxiliary agent).

In the present invention, "the conductive auxiliary agent containing a carbon material" and "the conductive auxiliary agent contains a carbon material" mean that, at least one kind of the conductive auxiliary agents used in the solid electrolyte composition according to the embodiment of the present invention is a carbon-based conductive auxiliary agent, and include an aspect including a conductive auxiliary agent other than the carbon-based conductive auxiliary agent. The solid electrolyte composition according to the embodiment of the present invention containing the dispersion medium (A) described later can maintain high dispersibility even though the solid electrolyte composition contains a carbon-based conductive auxiliary agent.

In the solid electrolyte composition according to the embodiment of the present invention, in a case where the conductive auxiliary agent contains a carbon-based conductive auxiliary agent and a conductive auxiliary agent other than the carbon-based conductive auxiliary agent, the form of each conductive auxiliary agent is not particularly limited. For example, an agglomeration of a carbon-based conductive auxiliary agent and a conductive auxiliary agent other than the carbon-based conductive auxiliary agent may be contained, and a carbon-based conductive auxiliary agent and a conductive auxiliary agent other than the carbon-based conductive auxiliary agent each may be contained alone (free) without forming an agglomeration of a carbon-based conductive auxiliary agent and a conductive auxiliary agent other than the carbon-based conductive auxiliary agent. The above described content form of each conductive auxiliary agent is the same for an electrode sheet for an all-solid state secondary battery and an active material layer of an all-solid state secondary battery, which will be described later.

In the present invention, in a case where the active material and the conductive auxiliary agent are used in combination, conductive auxiliary agents, among the above conductive auxiliary agents, which do not insert and release ions (preferably Li ions) of metals belonging to Group I or II of the periodic table during charge and discharge of the battery and do not function as an active material are used. Therefore, among the conductive auxiliary agents, conductive auxiliary agents that can function as an active material in the active material layer during charge and discharge of the battery are classified as active materials, not conductive auxiliary agents. Whether or not conductive auxiliary agents function as an active material during charge and discharge of the battery is not univocal and is determined based on a combination with the active material.

The carbon-based conductive auxiliary agent used in the present invention is not particularly limited as long as the carbon-based conductive auxiliary agent is a conductive auxiliary agent of a carbon material, and the carbon-based conductive auxiliary agent known as general conductive auxiliary agents can be used. Examples of the carbon-based conductive auxiliary agent include respective carbon-based conductive auxiliary agents of graphite that are electron conductive materials such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbon isotope such as graphene or fullerene which are electron-conductive materials.

The conductive auxiliary agents are preferably electron conductive materials, more preferably a carbon black, a carbon fiber or a carbon isotope, and even more preferably a carbon black.

Conductive auxiliary agents other than the carbon-based conductive auxiliary agent are not particularly limited, and known conductive auxiliary agents as general conductive auxiliary agents can be used. Examples thereof include metal powder, a metal fiber, a conductive polymer and the like.

The carbon-based conductive auxiliary agents and the conductive auxiliary agents other than the carbon-based conductive auxiliary agent may be used singly or two or more conductive auxiliary agents may be used.

A total content amount of the conductive auxiliary agent in the electrode layer composition is preferably 0.5% to 5% by mass, and more preferably 1% to 3% by mass of 100 parts by mass of the solid content. In a case where the content amount of the conductive auxiliary agent is in the above range, the drastic increase in electron conductivity is suppressed, and the balance between electron conductivity and ion conductivity is improved. Therefore, a capacity of the battery when used as an all-solid state secondary battery can be improved. The total content amount of the conductive auxiliary agent means a total content amount of a content amount of the carbon-based conductive auxiliary agent and a content amount of the conductive auxiliary agent other than the carbon-based conductive auxiliary agent. The content ratio of the carbon-based conductive auxiliary agent in the conductive auxiliary agent is not particularly limited as long as the content ratio is within the above range of the total content amount, for example, may be 10% by mass or more in the total content amount of the conductive auxiliary agent, and preferably 50% to 100% by mass.

A shape of the conductive auxiliary agent is not particularly limited, but is preferably particulate. The median diameter D50 of the conductive auxiliary agent is not particularly limited, and for example, preferably 0.01 to 1 µm, and more preferably 0.02 to 0.1 µm.

<Dispersion Medium>

The solid electrolyte composition according to the embodiment of the present invention contains a dispersion medium (A) for dispersing respective components contained in the solid electrolyte composition according to the embodiment of the present invention, particularly, the inorganic solid electrolyte, and furthermore the active material and the conductive auxiliary agent.

This dispersion medium (A) contains a ketone compound (A1) and a dispersant (A2). The dispersant (A2) is at least one dispersant selected from the group consisting of a ketone compound (A2-1) having a chemical structure different from the ketone compound (A1) and an alcohol compound (A2-2).

Therefore, the dispersion medium (A) includes: an aspect of containing the ketone compound (A1) and at least one ketone compound (A2-1); an aspect of containing the ketone compound (A1) and at least one alcohol compound (A2-2); an aspect of containing the ketone compound (A1), at least one ketone compound (A2-1), and at least one alcohol compound (A2-2); and furthermore an aspect of containing a dispersant in addition to the ketone compound (A1), the ketone compound (A2-1), and the alcohol compound (A2-2) in the respective aspects.

In the present invention, in a case where the dispersion medium (A) contains two or more ketone compounds, a ketone compound contained at the maximum content ratio with respect to the total mass (total content amount) of the dispersion medium (A) is defined as a ketone compound (A1), and a ketone compound contained at another content ratio is defined as a ketone compound (A2-1). In a case where two or more ketone compounds contained at the maximum content ratio are contained, a ketone compound having a small difference in the number of carbon atoms between the two groups bonded to a carbonyl group is defined as a ketone compound (A1), and even in a case where the number of carbon atoms is the same, a ketone compound having a large molecular weight is defined as a ketone compound (A1).

The dispersion medium (A) used in the present invention includes a form containing an aqueous dispersant in addition to a non-aqueous dispersant (does not contain an aqueous dispersant). In the form containing the aqueous dispersant, a content amount of the aqueous dispersant is appropriately determined within a range not exceeding the water content amount described above in the solid electrolyte composition. In the present invention, the term "non-aqueous dispersant" generally refers to a dispersant other than water. In a case where the dispersant is a non-aqueous dispersant, deterioration or decomposition of the inorganic solid electrolyte can be prevented.

(Ketone Compound (A1))

The ketone compound (A1) is a compound containing a carbonyl group in a molecule (two groups are bonded to a carbonyl group), and may be a compound that functions as a dispersant of the above described dispersoid. In addition, the ketone compound (A1) includes a cyclic ketone compound in which two groups bonded to a carbonyl group are bonded to each other to include a carbonyl group in a ring. Examples of the compounds functioning as the dispersant of the dispersoid include compounds that are in a state under conditions for dispersing the dispersoid, for example, at room temperature (25° C.). In the present invention, the ketone compound (A1) preferably has a structure in which two groups are not bonded to each other, more preferably molecules thereof have a linear-chain structure or a branched-chain structure as a whole, and even more preferably have a branched-chain structure. The two groups bonded to a carbonyl group may be the same or different from each other.

The ketone compound (A1) may be either an aromatic compound or an aliphatic compound, but is preferably a compound in which two aliphatic groups are bonded to a carbonyl group, and more preferably a compound in which two saturated aliphatic hydrocarbon groups (alkyl groups) are bonded to a carbonyl group.

Each of the aliphatic group and the saturated aliphatic hydrocarbon group may have any structure of a linear-chain, branched-chain, or cyclic, of which at least one (preferably two) preferably has a linear-chain structure or a branched-chain structure and more preferably has a branched-chain structure from the viewpoint of suppressing deterioration or decomposition of the inorganic solid electrolyte and furthermore dispersibility of the dispersoid. The number of carbon atoms of the aliphatic group and the saturated aliphatic hydrocarbon group is not particularly limited, and is preferably 1 to 8, more preferably 2 to 7, even more preferably 3 to 6, and particularly preferably 4 or 5.

Such a aliphatic group and a saturated aliphatic hydrocarbon group are not particularly limited, and examples thereof include methyl, ethyl, n-propyl, iso-propyl, n-butyl, sec-butyl, iso-butyl, tert-butyl, neo-pentyl (2,2-dimethylpropyl), iso-pentyl (3-methylbutyl), sec-pentyl (1-methylbutyl), 3-pentyl (1-ethylpropyl), tert-pentyl (1,1-dimethylpropyl), 2,4-dimethylpentyl, and the like.

The total carbon number of the ketone compound (A1) is determined based on the carbon number of the aliphatic group and the saturated aliphatic hydrocarbon group, and is preferably 6 or more, and on the other hand, preferably 15 or less, more preferably 12 or less.

In the present invention, in a case where the group or the compound has a substituent, the term "(total) carbon number of group or compound" refers to the total number of carbon atoms constituting the group or the compound including the substituent. Furthermore, the total carbon number of the compound may be simply referred to as the carbon number.

The ketone compound (A1) may be a compound in which the above described aliphatic group or saturated aliphatic hydrocarbon group is appropriately combined, and examples thereof include ethyl methyl ketone, methyl (iso-butyl) ketone (MIBK), di(sec-butyl) ketone, di(iso-butyl) ketone (DIBK), di(tert-butyl) ketone, di(isopentyl) ketone, 4,6-dimethyl-2-heptanone, and the like.

(Dispersant (A2))

The dispersant (A2) is at least one dispersant selected from the group consisting of a ketone compound (A2-1) and an alcohol compound (A2-2).

The details of each compound included in the dispersant (A2) will be described later, and the total carbon number of the dispersant (A2) is preferably 4 or more, more preferably 6 or more, and even more preferably 9 or more. The upper limit of the total carbon number is not particularly limited, and for example, preferably 15 or less, and more preferably 12 or less. The total carbon number of the dispersant (A2) is preferably equal to or greater than the total carbon number of the ketone compound (A1). It is more preferable that at least one dispersant (A2) is a structural isomer of the ketone compound (A1) described later.

A combination of the ketone compound (A1) and the dispersant (A2) is not particularly limited, and examples thereof preferably include a combination of a ketone compound (A1) and a dispersant (A2) having equal to or larger total carbon number as the ketone compound (A1), a combination of a ketone compound (A1) and a structural isomer of the ketone compound (A1) (a ketone compound (A2-1) is a positional isomer, and an alcohol compound (A2-2) is a functional isomer), and more specifically, the combinations adopted in Examples.

Focusing on the total number of carbon atoms, the combination of the ketone compound (A1) and the dispersant (A2) preferably includes a ketone compound (A1) having the total carbon number of 6 or more and a dispersant (A2) having the total carbon number of 4 or more.

The dispersant (A2) used in combination with the ketone compound (A1) may be at least one kind, preferably one to three kinds, and more preferably one or two kinds.

—Ketone Compound (A2-1)—

The ketone compound (A2-1) is a ketone compound containing a carbonyl group in a molecule and having a chemical structure different from the ketone compound (A1) (in some cases, referred to a ketone compound simply different from the ketone compound (A1), and any compound functioning as a dispersant for the above described dispersoid may be used.

In the present invention, "a ketone compound has a different chemical structure from the ketone compound (A1)" means "a ketone compound is different from the ketone compound (A1) as a compound", and isomers and the like are included. Examples of the ketone compound (A2-1) include a compound having a different molecular weight (the total carbon number) from the ketone compound (A1), a compound having the same molecular weight as the ketone compound (A1) but having a different structure (isomer), and the like. The isomers include various isomers (structural isomers and stereoisomers), and preferably include structural isomers. Examples thereof include isomers (positional isomers) that differ from each other in the position where the oxo group (=O) is substituted, isomers that differ from each other in the structures of groups bonded to the carbonyl group (the carbon chain), and the like.

The ketone compound (A2-1) is a compound that satisfies the above relationship with the ketone compound (1), and two groups bonded to a carbonyl group have the same as in the ketone compound (1), and the preferred examples thereof are also the same.

The total carbon number of the ketone compound (A2-1) is as described above. Particularly, in a case where the ketone compound (A1) has the total carbon number of 6 or more, the total carbon number of the ketone compound (A2-1) is preferably 4 or more, more preferably 6 or more, and even more preferably 9 or more.

Examples of the ketone compound (A2-1) include various ketone compounds described as the examples of the ketone compound (A1).

The ketone compound (A2-1) used in combination with the ketone compound (A1) may be one kind or two or more kinds.

In a case where the ketone compound (A1) and the ketone compound (A2-1) are used in combination, at least one ketone compound is preferably a ketone compound in which at least one of an aliphatic group or a saturated aliphatic hydrocarbon group bonded to a carbonyl group having 4 or more carbon atoms.

Examples of the combination of the ketone compound (A1) and the ketone compound (A2-1) include a combination of MIBK as the ketone compound (A1) and DIRK or 4,6-dimethyl-2-heptanone as the ketone compound (A2-1), a combination of DIBK as the ketone compound (A1) and 4,6-dimethyl-2-heptanone as the ketone compound (A2-1), and a combination of di(isopentyl) ketone as the ketone compound (A1) and 4,6-dimethyl-2-heptanone as the ketone compound (A2-1).

—Alcohol Compound (A2-2)—

The alcohol compound (A2-2) is a compound having a hydroxyl group in a molecule and may be any compound functioning as a dispersant of the above described dispersoid. In the present invention, the alcohol compound (A2-2) may have any structure of a linear, branched or cyclic, but preferably has a linear-chain structure or a branched-chain structure, and more preferably has a branched-chain structure.

The alcohol compound (A2-2) may be an aromatic compound or an aliphatic compound, but is preferably an aliphatic compound, and more preferably a saturated aliphatic compound (alkanol). In addition, the number of hydroxyl groups contained in the alcohol compound (A2-2) is not particularly limited, but is preferably one. Grade of the alcohol compound (A2-2) (in a case of having a plurality of hydroxyl groups, the highest grade) is not particularly limited, but is preferably tertiary.

Examples of the alcohol compound (A2-2) include a compound having a different molecular weight (the total carbon number) from the ketone compound (A1), a structural isomer of the ketone compound (A1) (a reductant of the ketone compound (A1) and a functional isomer), and the like.

The total carbon number of the alcohol compound (A2-2) is the same as the total carbon number of the dispersant (A2) described above.

The alcohol compound (A2-2) is not particularly limited, but includes, for example, 2-propanol, 2-butanol, 2-pentanol, 4-methyl-2-pentanol, 2-heptanol, 2,6-dimethyl-4-heptanol, 4,6-dimethyl-2-heptanol, and the like.

The alcohol compound (A2-2) used in combination with the ketone compound (A1) may be one kind or two or more kinds.

In a case where the ketone compound (A1) and the alcohol compound (A2-2) are used in combination, at least one of the ketone compound (A1) or the alcohol compound (A2-2) is preferably a ketone compound in which at least one of an aliphatic group or a saturated aliphatic hydrocarbon group bonded to a carbonyl group has 4 or more carbon atoms, or an alcohol compound in which at least one of groups bonded to carbon atoms which are substituted with hydroxyl groups has 4 or more carbon atoms.

Examples of the combination of the ketone compound (A1) and the alcohol compound (A2-2) include a combination of MIBK as the ketone compound (A1) and 4-methyl-2-pentanol, 2,6-dimethyl-4-heptanol, or 4,6-dimethyl-2-heptanol as the alcohol compound (A2-2), a combination of DIBK as the ketone compound (A1) and 2,6-dimethyl-4-heptanol, 4,6-dimethyl-2-heptanol as the alcohol compound (A2-2), and a combination of di(isopentyl) ketone as the ketone compound (A1) and 2,6-dimethyl-4-heptanol or 4,6-2-heptanol as the alcohol compound (A2-2).

In a case where the dispersant (A2) contains the ketone compound (A2-1) and the alcohol compound (A2-2), combinations of each compound is not particularly limited, and for example, the above described combination of the ketone compound (A1) and the ketone compound (A2-1) and the above described combination of the ketone compound (A1) and the alcohol compound (A2-2) can be appropriately combined.

The dispersants (A1) and (A2) may have a substituent, but preferably have no substituent.

—Other Dispersant—

As described above, the dispersion medium (A) may include a dispersant (another dispersant) other than the ketone compound (A1) and the dispersant (A2). Such a dispersant is not particularly limited, and examples thereof include various organic dispersants. Examples of such an organic dispersant include various dispersants such as an ether compound, an amide compound, an amine compound, an aromatic compound, an aliphatic compound, a nitrile compound, and an ester compound. Among these, a non-polar dispersant is preferable. In the present invention, the term "non-polar dispersant" refers to a dispersant consisting of carbon atoms and hydrogen atoms. An example of the non-polar dispersant includes an aromatic hydrocarbon compound or an aliphatic hydrocarbon compound, an aliphatic hydrocarbon compound is more preferable, and a saturated aliphatic hydrocarbon compound is even more preferable.

Examples of the aromatic hydrocarbon compound include benzene, toluene, xylene and the like.

The aliphatic hydrocarbon compound is not particularly limited as long as the aliphatic hydrocarbon compound is an aliphatic hydrocarbon compound, but a saturated aliphatic hydrocarbon compound (alkane) is preferable. The aliphatic hydrocarbon compound may have any structure of a linear, branched or cyclic. Examples of the aliphatic hydrocarbon compound include alkanes having 6 to 10 carbon atoms such as hexane, heptane, octane, decane, cyclohexane, ethylcyclohexane, methylcyclohexane, and cyclooctane, paraffin, gasoline, naphtha, kerosene, light oil, and the like.

The other dispersant that can be used in combination may be one kind or two or more kinds.

The total content amount of the dispersion medium (A) in the solid electrolyte composition is not particularly limited, but is preferably 20% to 80% by mass, more preferably 30% to 70% by mass, and particularly preferably 40% to 60% by mass.

In the solid electrolyte composition according to the embodiment of the present invention, the content ratio of the dispersant (A2) in the dispersion medium (A) is preferably more than 0% by mass and less than 50% by mass. In a case where the dispersant medium (A) contains the dispersant (A2) at this content ratio, the dispersoid in the solid electrolyte composition can be dispersed with excellent dispersibility while suppressing deterioration or decomposition of the inorganic solid electrolyte. Furthermore, an excellent dispersion state can be maintained even during the application and/or drying of the solid electrolyte composition according to the embodiment of the present invention. The content ratio of the dispersant (A2) is more preferably 1% to 30% by mass, and even more preferably 1% to 25% by mass, and particularly preferably 2% to 15% by mass, from the viewpoint of suppressing deterioration or decomposition of the inorganic solid electrolyte and furthermore dispersibility of the dispersoid.

In addition, the content ratio of the ketone compound (A1) in the dispersion medium (A) is appropriately determined so that the total content amount of the dispersion medium (A) and the content ratio of the dispersant (A2) satisfy the above range, respectively. For example, from the viewpoint of suppressing deterioration or decomposition of the inorganic solid electrolyte and furthermore dispersibility of the dispersoid, the content is preferably more than 0% by mass and less than 100% by mass, more preferably 40% to less than 100% by mass, even more preferably 70% to 99% by mass, and particularly preferably 70% to 98% by mass.

Furthermore, the content ratio of the other dispersant that can be used in combination in the dispersing medium (A) is appropriately determined so that the total content amount of the dispersing medium (A) or the like satisfies the above range. For example, the content is preferably 0% to 60% by mass, more preferably 2% to 50% by mass, and even more preferably 5% to 40% by mass.

The content ratio of the ketone compound (A2-1) in the dispersion medium (A) is not particularly limited as long as the content ratio of the dispersant (A2) satisfies the above range, but is preferably, for example, 0% to 25% by mass, and more preferably 0% to 15% by mass. In addition, the content ratio of the alcohol compound (A2-2) in the dispersion medium (A) is not particularly limited as long as the content ratio of the dispersant (A2) satisfies the above range, but is preferably, for example, 0% to 20% by mass, and more preferably 0% to 10% by mass. A content amount of the ketone compound (A2-1) and a content amount of the alcohol compound (A2-2) may not become 0% by mass.

In the dispersion medium (A), a mass ratio of a content ratio of the ketone compound (A1) to a content ratio of the dispersant (A2) [content ratio of ketone compound (A1)/content ratio of dispersant (A2)] is not particularly limited as long as the content ratio satisfies the above range, but is preferably, for example, 7/3 to 99/1, more preferably 85/15 to 98/2, and even more preferably 95/5 to 98/2.

In the present invention, the content ratio in the dispersion medium (A) has the same meaning of the content with respect to the total mass of each dispersant and furthermore the content in the solid electrolyte composition. In the present invention, a content amount and a content ratio are defined as a total amount in a case where there are a plurality of corresponding components.

<Binder>

The solid electrolyte composition according to the embodiment of the present invention may contain a binder.

The binder is not particularly limited as long as the binder is a binder polymer generally used in a solid electrolyte composition for an all-solid state secondary battery. Examples thereof suitability include a (meth)acrylic polymer, a urethane polymer, a urea polymer, an amide polymer, an imide polymer, an ester polymer, a hydrocarbon rubber, a fluoro rubber and the like.

The (meth)acrylic polymer is not particularly limited as long as the (meth)acrylic polymer is a polymer formed of a (meth)acrylic monomer, and examples thereof include polymethyl(meth)acrylate, poly(meth)acrylic acid, and hydroxymethyl poly(meth)acrylate. Furthermore, examples thereof suitability include polymers described in JP2015-088486A.

Examples of the urethane polymer, urea polymer, amide polymer, imide polymer and ester polymer suitability include polymers described in JP2015-088480A.

Examples of the hydrocarbon rubber include natural rubber, polybutadiene, polyisoprene, polystyrene butadiene, and hydrogenated polymers thereof.

The fluoro rubber preferably has a repeating unit derived from vinylidene fluoride, and examples of such a polymer include polyvinylidene difluoride, polyvinylidene difluoride hexafluoropropylene, and the like.

Preferably, the binder is a polymer particle. In this case, an average particle diameter of the polymer particles is preferably 0.01 to 10 μm, and more preferably 0.01 to 1 μm. The average particle diameter of the polymer particles is a median diameter measured in the same manner as the above described median diameter of the inorganic solid electrolyte particles.

The measurement for the produced all-solid state secondary battery can be performed by, for example, measuring the electrode material after disassembling the battery and peeling off the electrode, and then excluding the measured values of the average particle diameter of particles other than the polymer particles measured in advance.

Commercially available polymer particles may be used, and polymer particles described in JP2016-139511A can be suitably used.

The weight average molecular weight of the binder, particularly the above described suitable polymer, is preferably 10,000 or more, more preferably 20,000 or more, and even more preferably 30,000 or more. The upper limit is preferably 1,000,000 or less, more preferably 200,000 or less, and even more preferably 100,000.

In the present invention, unless otherwise specified, the term "weight-average molecular weight of binder" refers to a weight-average molecular weight in terms of standard polystyrene conversion measured by gel permeation chromatography (GPC). A value which is measured using the method of condition A or condition B (priority) below as the measurement method is set as a base. Here, depending on the binder polymer type, a suitable eluent may be appropriately selected and used.

(Condition A)
  Column: Two pieces of TOSOH TSKgel Super AWM-H are connected to each other
  Carrier: 10 mM LiBr/N-methylpyrrolidone
  Measurement temperature: 40° C.
  Carrier flow rate: 1.0 mL/min
  Specimen concentration: 0.1% by mass
  Detector: RI (refractive index) detector (Condition B) Priority
  Column: Column to which TOSOH TSKgel Super HZM-H (trade name), TOSOH TSKgel Super HZ4000 (trade name), or TOSOH TSKgel Super HZ2000 (trade name) is connected is used.
  Carrier: Terahydrofuran
  Measurement temperature: 40° C.
  Carrier flow rate: 1.0 mL/min
  Specimen concentration: 0.1% by mass
  Detector: RI (refractive index) detector The content amount of the binder in the solid electrolyte composition is preferably 0.01% by mass or more with respect to 100% by mass of a solid component, more preferably 0.1% by mass or more, and even more preferably 1% by mass or more, from the viewpoint of compatibility between binding properties with the solid particles such as the inorganic solid electrolyte particles, the active material, and the conductive auxiliary agent, and ion conductivity. From the viewpoint of battery capacity, the upper limit is preferably 20% by mass or less, more preferably 10% by mass or less, and even more preferably 5% by mass or less.

In the solid electrolyte composition of the present invention, a mass ratio of the total mass (the total amount) of the inorganic solid electrolyte and the active material to the mass of the binder [(Mass of inorganic solid electrolyte+Mass of active material)/(Mass of binder)] is preferably in a range of 1,000 to 1. This ratio is more preferably in a range of 500 to 2, and even more preferably 100 to 10.

The binder may be used singly or two or more inorganic solid electrolytes may be used in combination.

<Other Additive>

The solid electrolyte composition according to the embodiment of the present invention can appropriately contain a thickener, a crosslinking agent (such as a crosslinking agent undergoing a crosslinking reaction by radical polymerization, condensation polymerization, or ring-opening polymerization), a polymerization initiator (such as a polymerization initiator generating an acid or radical by being heated or irradiated with light), an antifoaming agent, a leveling agent, a dehydrating agent, an antioxidant, and the like, as components other than the above described components.

[Method of Manufacturing Solid Electrolyte Composition]

The solid electrolyte composition according to the embodiment of the present invention can be prepared, preferably as a slurry, by mixing the inorganic solid electrolyte, the active material, the conductive auxiliary agent, and the above described components under the presence of the above described dispersion medium (A) (in the dispersion medium (A)) using various types of mixers (a step of dispersing the inorganic solid electrolyte).

The mixing method in the dispersing step is not particularly limited, and the respective components may be mixed at once or may be sequentially mixed. For example, the active material, the conductive auxiliary agent, the binder, other additives, and the like each may be mixed when the inorganic solid electrolyte and the dispersion medium (A) are mixed, or may be separately mixed. In addition, in a case where the carbon-based conductive auxiliary agent and a conductive auxiliary agent other than the carbon-based conductive auxiliary agent are used in combination as the conductive auxiliary agent, the carbon-based conductive auxiliary agent and the conductive auxiliary agent other than the carbon-based conductive auxiliary agent are simultaneously mixed, or may be sequentially mixed.

The solid electrolyte composition can be prepared by mixing various components using various mixers. The mixer is not particularly limited, and examples thereof include a ball mill, a beads mill, a planetary mixer, a blade mixer, a roll mill, a kneader, and a disk mill. The mixing conditions are not particularly limited, and for example, the mixing temperature is set to 10° C. to 60° C., the mixing time is set to five minutes to five hours, and the rotation speed is set to 10 to 700 rpm (rotation per minute). In a case where a ball mill is used as the mixer, it is preferable to set the rotation speed at 150 to 700 rpm and the mixing time at five minutes to 24 hours, at the above described mixing temperature. In addition, it is preferable that formulation quantity of each component is set so as to become the above described content amount.

Mixing environment is not particularly limited, but may be under dried air, under an inert gas, or the like.

In a case where the solid electrolyte composition according to the embodiment of the present invention contains an active material, and furthermore contains a conductive auxiliary agent, the solid electrolyte composition is preferably prepared by a method having a step of preliminarily dispersing (stirring) the inorganic solid electrolyte in the dispersion medium (A) described above, and more preferably by a method having a step of mixing the preliminary dispersion obtained after the preliminarily dispersing step, the active material, and furthermore the conductive auxiliary agent. By the above described preferred method (referred to as a method of manufacturing an electrode layer composition of the present invention), deterioration and decomposition of the inorganic solid electrolyte are prevented, and furthermore the inorganic solid electrolyte, the active material, and the conductive auxiliary agent can be dispersed with excellent dispersibility. Therefore, in a case of manufacturing an electrode sheet for an all-solid state secondary battery or an all-solid state secondary battery by the method of manufacturing an electrode layer composition of the present invention or using the electrode layer composition obtained by the manufacturing method, further improvement in battery capacity can be expected.

In the method of manufacturing an electrode layer composition of the present invention, first, the inorganic solid electrolyte is preliminarily dispersed (stirred) in the dispersion medium (A). The used dispersion medium (A) is the same as described above, and the preferred form is also the same. The preliminarily dispersing step is the same as the above described dispersing step except that the inorganic solid electrolyte is dispersed in the dispersion medium (A) and all the active material and conductive auxiliary agent are not dispersed, and the mixing conditions when preparing the solid electrolyte composition (the dispersing step), preferably the mixing conditions when a ball mill is used, can be applied.

The preliminarily dispersing step is preferably a mixing step or stirring method in which a mechanical shearing force (stirring action) acts on the inorganic solid electrolyte from the viewpoints that the dispersibility of the inorganic solid electrolyte is improved, and particularly, the inorganic solid electrolyte becomes finer (crushing agglomerates, and the like). For example, among the above mixers, it is preferable to use a mixer such as a ball mill, a beads mill, a planetary mixer, or the like. By such a step, deterioration and decomposition of the inorganic solid electrolyte are suppressed and thus dispersibility in the dispersion medium can be further improved. In the preliminarily dispersing step, the degree of refining the inorganic solid electrolyte is not particularly limited, and for example, the median diameter is preferably 3.0 μm or less, and more preferably 2.0 μm or less.

In the preliminarily dispersing step, components other than the active material and the conductive auxiliary agent, furthermore a part of the active material and/or the conductive auxiliary agent used in a mixing step as described below, can be mixed.

Thus, a preliminary dispersion of the inorganic solid electrolyte can be obtained.

Next, in the method of manufacturing a solid electrolyte composition according to the embodiment of the present invention, subsequently, a step of mixing the obtained preliminary dispersion of the inorganic solid electrolyte, the active material, and furthermore the appropriate conductive auxiliary agent is performed. The active material and the conductive auxiliary agent are the same as described above, and the preferred examples thereof are also the same.

In the mixing step, the dispersion medium for mixing (dispersing) the respective components may be the dispersion medium (A) contained in the preliminary dispersion, and a new dispersion medium may be used separately from the dispersion medium (A). In the present invention, it is preferable to use the dispersion medium (A) contained in the preliminary dispersion. The dispersion medium newly used may be the same dispersant as the dispersion medium (A) used in the preliminarily dispersing step or may be a different dispersant (for example, each dispersant contained in the dispersion medium (A) alone).

In the mixing step, an inorganic solid electrolyte isolated from the obtained preliminary dispersion and a new dispersant may be used as the preliminary dispersion.

In a case of mixing the preliminary dispersion with the active material and the conductive auxiliary agent, the order of mixing with the preliminary dispersion is not particularly limited, and the active material and the conductive auxiliary agent may be mixed simultaneously, or one of the active material and the conductive auxiliary agent is mixed earlier than the other. In addition, in a case where a carbon-based conductive auxiliary agent and a conductive auxiliary agent other than the carbon-based conductive auxiliary agent are used in combination as a conductive auxiliary agent, a mixture of the carbon-based conductive auxiliary agent and the conductive auxiliary agent other than the carbon-based conductive auxiliary agent may be mixed with the preliminary dispersion and the like, and the carbon-based conductive auxiliary agent and the conductive auxiliary agent other than the carbon-based conductive auxiliary agent may be separately mixed with the preliminary dispersion and the like.

A mixing ratio of respective components in the mixing step is the same as the content amount of respective components in the solid electrolyte composition of the present invention, and a preferable range is also the same.

Mixing conditions may be any conditions that allow the components to be mixed and dispersed, and for example, the mixing conditions when preparing the solid electrolyte composition can be applied. The mixing conditions are preferably easier conditions than the conditions for the preliminary dispersion. In a case of using a ball mill, the mixing conditions when preparing the solid electrolyte composition, preferably the mixing conditions in a case of using a ball mill, can be applied.

Thus, the solid electrolyte composition according to the embodiment of the present invention can be prepared.

The solid electrolyte composition according to the embodiment of the present invention can disperse the solid electrolyte composition by effectively suppressing re-agglomeration thereof. Furthermore, an excellent dispersion state of the dispersoid can be maintained even during the application and/or drying. Therefore, as described later, the solid electrolyte composition is preferably used as a material for forming a solid electrolyte layer or solid electrolyte sheet of an all-solid state secondary battery.

In addition, even though a carbon material is used as a conductive auxiliary agent, the electrode layer composition of the present invention can be dispersed by effectively suppressing re-aggregation thereof. Furthermore, an excellent dispersion state of the dispersoid can be maintained even during the application and/or drying. Therefore, as described later, the electrode layer composition is preferably used as a material for forming an electrode active material layer of an all-solid state secondary battery or an electrode sheet for an all-solid state secondary battery.

[Solid Electrolyte-Containing Sheet]

A solid electrolyte-containing sheet is a sheet-like foaming body capable of forming a constituent layer of an all-solid state secondary battery, and includes various aspects depending on the use. Examples thereof include a sheet preferably used for the solid electrolyte layer (also referred to as a solid electrolyte sheet for an all-solid state secondary battery), an electrode, or a sheet preferably used for a laminate of an electrode and a solid electrolyte layer (an electrode sheet for an all-solid state secondary battery), and the like.

The electrode sheet for an all-solid state secondary battery may be a sheet having an active material layer (an electrode layer), and may be a sheet having an active material layer (an electrode layer) termed on a base material (an electrode collector) or a sheet having no base material and formed of an active material layer (an electrode layer). The electrode sheet is a sheet suitably used for forming an active material layer of the all-solid state secondary battery, or a laminate of a solid electrolyte layer and an active material layer of the all-solid state secondary battery. Therefore, this electrode sheet is generally a sheet having an electrode collector and an active material layer, but an aspect having an electrode collector, an active material layer, and a solid electrolyte layer in this order, and an aspect having an electrode collector, an active material layer, a solid electrolyte layer, and an active material layer in this order are also included. The electrode sheet may have another layer as long as the electrode sheet has an active material layer. Examples of other layers include a protective layer (a peeling sheet), an electrode collector, a coating layer, and the like. A layer thickness of each layer constituting the electrode sheet is the same as a layer thickness of each layer described in the following description of the all-solid state secondary battery.

The active material layer of the electrode sheet is preferably formed of the solid electrolyte composition (the electrode layer composition) according to the embodiment of the present invention. An excellent battery capacity can be provided to the all-solid state secondary battery by using the electrode sheet as a material constituting the (negative electrode or positive electrode) active material layer of the all-solid state secondary battery. The active material layer of the electrode sheet can preferably exhibit a high level of ion conductivity and electron conductivity in a well-balanced manner. The content amount of respective components in the active material layer of the electrode sheet is not particularly limited, but is preferably the same as the content amount of each component in the solid content of the solid electrolyte composition (electrode layer composition) according to the embodiment of the present invention.

The base material is not particularly limited as long as the base material can support the active material layer, and examples thereof include a sheet (plate) formed of materials described in the following description of an electrode collector, organic materials, inorganic materials, and the like. Examples of the organic materials include various polymers, and specific examples thereof include polyethylene terephthalate, polypropylene, polyethylene, cellulose, and the like. Examples of the inorganic materials include glass, ceramic, and the like.

The solid electrolyte sheet for an all-solid state secondary battery and the solid electrolyte layer are preferably formed of the solid electrolyte composition according to the embodiment of the present invention. An excellent battery capacity can be provided to the all-solid state secondary battery by using the solid electrolyte sheet for an all-solid state secondary battery as a material constituting the solid electrolyte layer of the all-solid state secondary battery. The solid electrolyte layer of the solid electrolyte sheet for an all-solid state secondary battery can exhibit a high level of ion conductivity. The content amount of respective components in the solid electrolyte layer of the solid electrolyte sheet for an all-solid state secondary battery is not particularly limited, but is preferably the same as the content amount of each component in the solid content of the solid electrolyte composition according to the embodiment of the present invention. The solid electrolyte sheet for an all-solid state secondary battery and the solid electrolyte layer generally contain no positive electrode active material and/or no negative electrode active material.

A layer thickness of the solid electrolyte layer of the solid electrolyte sheet for an all-solid state secondary battery is the same as the layer thickness of the solid electrolyte layer described in the following description of an all-solid state secondary battery. Examples of the solid electrolyte sheet for an all-solid state secondary battery include a sheet having the solid electrolyte layer and the protective layer on the base material in this order, and a sheet consisting of the solid electrolyte layer (a sheet having no base material).

[Method of Manufacturing Solid Electrolyte-Containing Sheet]

A method of manufacturing a solid electrolyte-containing sheet is not particularly limited. The solid electrolyte-containing sheet can be manufactured through (including) a method of manufacturing a solid electrolyte composition according to the embodiment of the present invention. Focusing on raw materials used, the solid electrolyte-containing sheet can be manufactured using the solid electrolyte composition according to the embodiment of the present invention. An example of the method includes a method of preparing a solid electrolyte composition according to the embodiment of the present invention as described above, forming a film by (application and drying) the obtained solid electrolyte composition on a base material (another layer may be interposed), and forming a solid electrolyte layer and/or an active material layer as an applied and dried layer on the base material. Thereby, the solid electrolyte-containing sheet having the base material and the applied and dried layer can be produced. In the solid electrolyte composition according to the embodiment of the present invention, deterioration or decomposition of the inorganic solid electrolyte and re-agglomeration or precipitation of the inorganic solid electrolyte and the like can be effectively suppressed even during application and drying, and the inorganic solid electrolyte can be maintained in an excellent dispersion state. Similarly, in a case of containing the active material and the conductive auxiliary agent, the dispersoid can be maintained in an excellent dispersion state. In addition, the solid electrolyte composition exhibits high layer forming ability, so that an active material layer having a desired layer thickness and shape can be formed. Therefore, the solid electrolyte-containing sheet produced using the solid electrolyte composition according to the embodiment of the present invention is used as a material constituting the solid electrolyte layer of the all-solid state secondary battery, whereby an excellent battery capacity can be provided to the all-solid state secondary battery. This solid electrolyte-containing sheet preferably can exhibit ion conductivity at a high level, and in a case of containing the active material and furthermore the conductive auxiliary agent, ion conductivity and electron conductivity preferably can be exhibited a high level.

Herein, the term "applied and dried layer" refers to a layer formed by applying the solid electrolyte composition according to the embodiment of the present invention and drying the dispersion medium (A) (that is, a layer formed by using the solid electrolyte composition according to the embodiment of the present invention, and formed of the composition obtained by removing the dispersion medium (A) from the solid electrolyte composition according to the embodiment of the present invention). The dispersant may remain in the applied and dried layer as long as the effects of the present invention are not impaired, a residual amount can be, for example, 3% by mass or less in each layer. A solid electrolyte layer (including an active material layer) from which such a dispersion medium (A) is removed can be formed using the solid electrolyte composition according to the embodiment of the present invention while maintaining the dispersoid to be in the above described excellent dispersion state.

In the method of manufacturing a solid electrolyte-containing sheet, the solid electrolyte composition according to the embodiment of the present invention is preferably used as a slurry, and the solid electrolyte composition according to the embodiment of the present invention can be made into a slurry by a known method. Each step in which the solid electrolyte composition according to the embodiment of the present invention is applied and dried will be described in the following description of a method of manufacturing an all-solid state secondary battery, including a case of forming a laminate of the solid electrolyte layer and/or the active material layer.

In the method of manufacturing a solid electrolyte-containing sheet according to the embodiment of the present invention, the applied and dried layer obtained as described above can be pressurized. A pressurizing condition and the like will be described in the following description of the method of manufacturing an all-solid state secondary battery.

In addition, in the method of manufacturing the solid electrolyte-containing sheet according to the embodiment of the present invention, the base material, the protective layer (particularly the peeling sheet), or the like can also be peeled.

[All-Solid State Secondary Battery]

The all-solid state secondary battery includes a positive electrode active material layer, a negative electrode active material layer facing the positive electrode active material layer, and a solid electrolyte layer disposed between the positive electrode active material layer and the negative electrode active material layer.

The solid electrolyte layer, the positive electrode active material layer, and the negative electrode active material layer, particularly the positive electrode active material layer of the all-solid state secondary battery are formed of the solid electrolyte composition according to the embodiment of the present invention. The positive electrode active material layer preferably contains an inorganic solid electrolyte, an active material, and a conductive auxiliary agent. The solid electrolyte layer may be formed of a known composition containing the inorganic solid electrolyte instead of the solid electrolyte composition according to the embodiment of the present invention. In addition, in a case where the negative electrode active material layer is not formed of the solid electrolyte composition according to the embodiment of the present invention, a layer containing the inorganic solid electrolyte, the active material, and the above components as appropriate, a lithium metal layer, or the like is employed. The solid electrolyte layer contains a solid electrolyte having ion conductivity of metals belonging to Group I or II of the periodic table, and the above components as appropriate.

The all-solid state secondary battery in which at least one of the solid electrolyte layer and or active material layer is formed of the solid electrolyte composition according to the embodiment of the present invention (hereinafter, in some cases, referred to as the all-solid state secondary battery according to the embodiment of the present invention) exhibits high ion conductivity and high battery capacity. The all-solid state secondary battery in which the active material layer is formed of the solid electrolyte composition according to the embodiment of the present invention exhibits a high level of ion conductivity and electronic conductivity in a well-balanced manner.

A lithium metal layer that can constitute the negative electrode active material layer means a lithium metal layer, and specific examples thereof include a layer formed by depositing or molding lithium powder, a lithium foil, a lithium vapor deposition film, and the like. The thickness of the lithium metal layer is not particularly limited, and can be, for example, 0.01 to 100 μm.

(Positive Electrode Active Material, Solid Electrolyte Layer, Negative Electrode Active Material Layer)

In the all-solid state secondary battery of the present invention, as described above, the solid electrolyte composition or the active material layer, particularly the positive electrode active material layer, is formed of the solid electrolyte composition according to the embodiment of the present invention or the above described solid electrolyte-containing sheet. Respective components and the content amount thereof contained in the solid electrolyte layer and the active material layer to be formed are preferably the same as those in the solid content of the solid electrolyte composition or the solid electrolyte-containing sheet, unless otherwise specified.

Thicknesses of the negative electrode active material layer, the solid electrolyte layer, and the positive electrode active material layer are not particularly limited. The thickness of each layer is preferably 10 to 1,000 μm, more preferably 20 μm or more and less than 500 μm form the viewpoint of the dimensions of a general all-solid state secondary battery. In the all-solid state secondary battery according to the embodiment of the present invention, it is even more preferable that at least one of the positive electrode active material layer, the solid electrolyte layer, or the negative electrode active material layer has a thickness of 50 μm or more and less than 500 μm.

The positive electrode active material layer and the negative electrode active material layer may include an electrode collector on a side opposite to the solid electrolyte layer, respectively.

(Housing)

Depending on the application, the all-solid state secondary battery according to the embodiment of the present invention may be used as the all-solid state secondary battery with the above described structure, but, in order to have a dry battery cell form, the all-solid state secondary battery is preferably further sealed in an appropriate housing. The housing may be made of metal or resin (plastic). In a case where a metal housing is used, examples thereof include an aluminum alloy housing and a stainless steel housing. It is preferable that the metal housing is separately used as the housing for the positive electrode and the housing for the negative electrode and is electrically connected to the positive electrode collector and the negative electrode collector respectively. It is preferable that the housing for the positive electrode and the housing for the negative electrode are bonded together through a gasket for short-circuit prevention and are thus integrated.

Hereinafter, an all-solid state secondary battery according to a preferred embodiment of the present invention will be described with reference to the FIGURE, but the present invention is not limited thereto.

The FIGURE is a cross-sectional view schematically illustrating an all-solid state secondary battery (a lithium ion secondary battery) according to a preferred embodiment of the present invention. The all-solid state secondary battery 10 according to the embodiment of the present invention includes a negative electrode collector 1, a negative electrode active material layer 2, a solid electrolyte layer 3, a positive electrode active material layer 4, and a positive electrode collector 5 in this order as viewed from the negative electrode side. The respective layers are in contact with one another and have a laminated structure. In a case where the above described structure is employed, during charging, electrons (e−) are supplied to the negative electrode side, and lithium ions (Li+) are accumulated on the negative electrode side. On the other hand, during discharging, the lithium ions (Li+) accumulated on the negative electrode side return to the positive electrode, and electrons are supplied to an operation portion 6. In an example illustrated in the drawing, an electric bulb is employed as the operation portion 6 and is lit by discharging.

The solid electrolyte composition according to the embodiment of the present invention can be preferably used as a material used to form the negative electrode active material layer, the positive electrode active material layer, or the solid electrolyte layer. Furthermore, the solid electrolyte-containing sheet according to the embodiment of the present invention is suitable as the solid electrolyte layer, the negative electrode active material layer, or the positive electrode active material layer.

In the present specification, in some cases, a positive electrode active material layer (hereinafter, also referred to as a positive electrode layer) and a negative electrode active material layer (hereinafter, also referred to as a negative electrode layer) are collectively referred to as electrode layers or active material layers.

In a case where an all-solid state secondary battery having the layer constitution shown in the FIGURE is put into a 2032-type coin case, the all-solid state secondary battery ill be referred to as an electrode sheet for an all-solid state secondary battery, and a battery produced by putting this electrode sheet for an all-solid state secondary battery into a 2032-type coin case will be referred to as an all-solid state secondary battery, whereby the electrode sheet for an all-solid state secondary battery and the all-solid state secondary battery will be differentiated in some cases.

(Positive Electrode Active Material Layer, Solid Electrolyte Layer, Negative Electrode Active Material Layer)

In the all-solid state secondary battery 10, any one of the solid electrolyte layer and the active material layer, preferably the positive electrode active material layer, and more preferably all the layers are formed using the solid electrolyte composition according to the embodiment of the present invention or the above described solid electrolyte-containing sheet. Thereby, the all-solid state secondary battery exhibits a high battery capacity. The details of the reason are as described above.

Each component contained ire the positive electrode active material layer 4, the solid electrolyte layer 3, and the negative electrode active material layer 2 may be the same or different from each other.

The negative electrode active material layer can be formed using the solid electrolyte composition according to the embodiment of the present invention or the above described electrode sheet, or can be formed of a lithium metal layer.

The positive electrode collector 5 and the negative electrode collector 1 are preferably electronic conductors.

In the present invention, one or both of the positive electrode collector and the negative electrode collector may be simply referred to as an electrode collector.

As materials for forming positive electrode collectors, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and among these, aluminum and an aluminum alloy are more preferred.

As materials for forming negative electrode collectors, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the electrode collector, generally, electrode collectors having a film sheet-like shape are used, but it is also possible to use net-shaped collectors, punched collectors, compacts of lath bodies, porous bodies, foaming bodies, or fiber groups, and the like.

The thickness of the electrode collector is not particularly limited, but is preferably 1 to 500 μm. In addition, the surface of the electrode collector is preferably provided with roughness by means of a surface treatment.

In the present invention, a functional layer, a member, or the like may appropriately interposed or provided between or outside respective layers of the negative electrode collector, the negative electrode active material layer, the solid electrolyte layer, the positive electrode active material layer, and the positive electrode collector. In addition, the respective layers may be composed of a single layer or multiple layers.

[Method of Manufacturing All-Solid State Secondary Battery]

The all-solid state secondary battery according to the embodiment of the present invention is not particularly limited, and can be manufactured through (including) a method of manufacturing a solid electrolyte composition according to the embodiment of the present invention. Focusing on raw materials used, the solid electrolyte-containing sheet can be manufactured using the solid electrolyte composition according to the embodiment of the present invention. Specifically, the all-solid state secondary battery can be manufactured by preparing the above described solid electrolyte composition according to the embodiment of the present invention, using the obtained solid electrolyte composition and the like, and forming the solid electrolyte layer and/or the active material layer of the all-solid state secondary battery. Thereby, the all-solid state secondary battery having a high battery capacity can be manufactured. The method of preparing the solid electrolyte composition according to the embodiment of the present invention is the same as the above description, and thus will not be repeatedly described.

The all-solid state secondary battery according to the embodiment of the present invention can be manufactured through a method including (through) a step of applying a solid electrolyte composition according to the embodiment of the present invention onto a base material (for example, a metal foil serving as an electrode collector) and forming a coating film (forming a film).

For example, an example of the method of manufacturing an all-solid state secondary battery includes the following method. That is, a solid electrolyte composition (electrode layer composition) according to the embodiment of the present invention is applied as a positive electrode composition onto a metal foil that is a positive electrode collector to form a positive electrode active material layer, and thereby a positive electrode sheet for an all-solid state secondary battery is produced. Next, a solid electrolyte composition for forming a solid electrolyte layer is applied onto the positive electrode active material layer to form a solid electrolyte layer. Furthermore, a solid electrolyte composition according to the embodiment of the present invention is applied as a negative electrode composition (an electrode layer composition) onto the solid electrolyte layer to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can also be manufactured by enclosing the all-solid state secondary battery in a housing.

In addition, it is also possible to manufacture an all-solid state secondary battery by carrying out the methods of forming the respective layers in a reverse order so as to form a negative electrode active material layer, a solid electrolyte layer, and a positive electrode active material layer on a negative electrode collector and overlaying a positive electrode collector thereon.

Examples of other methods include the following methods. That is, a positive electrode sheet for an all-solid state secondary battery is produced as described above. Furthermore, a solid electrolyte composition according to the embodiment of the present invention is applied as a negative electrode composition onto a metal foil that is a negative electrode collector to form a negative electrode active material layer, and thereby a negative electrode sheet for an all-solid state secondary battery is produced. Next, a composition for forming a solid electrolyte layer according to the embodiment of the present invention is applied to form a solid electrolyte layer on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. Thus, the all-solid state secondary battery can be manufactured as described above.

In addition, examples of other methods include the following methods. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, and thereby a solid electrolyte sheet for an all-solid state secondary battery consisting of a solid electrolyte layer is produced. Furthermore, the positive electrode sheet for an all-solid state secondary battery and the negative electrode sheet for an all-solid state secondary battery are laminated together so as to sandwich the solid electrolyte layer that has been peeled off from the base material. Thus, the all-solid state secondary battery can be manufactured as described above.

An all-solid state secondary battery can be manufactured by combining the above described forming methods For example, as described above, a positive electrode sheet for an all-solid state secondary battery, a negative electrode sheet for an all-solid state secondary battery, and a solid electrolyte sheet for an all-solid state secondary battery are produced respectively. Next, a solid electrolyte layer that has been peeled off from the base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

Any of the respective above manufacturing methods is a method of forming a solid electrolyte layer, a negative electrode active material layer, and a positive electrode active material layer with the solid electrolyte composition according to the embodiment of the present invention, but in a method of manufacturing an all-solid secondary battery according to the embodiment of the present invention, at least one of a solid electrolyte layer, a negative electrode active material layer, or a positive electrode active material layer, preferably a positive electrode active material layer (more preferably a positive electrode active material layer containing a conductive auxiliary agent) is formed with the solid electrolyte composition according to the embodiment of the present invention. In a case of forming a solid electrolyte layer with a composition other than the solid electrolyte composition according to the embodiment of the present invention, examples of the materials include a commonly used solid electrolyte composition and the like, and in a case of forming a negative electrode active material layer, examples of the materials include known negative electrode active material compositions, a lithium metal foil, or the like. In addition, the solid electrolyte layer and the like can also be formed by, for example, press-forming the solid electrolyte composition on the active material layer under pressurizing conditions described later.

A preferred aspect of a method of manufacturing an all-solid state secondary battery according to the embodiment of the present invention is a method of applying (preferably, simultaneously applying multiple layers) a solid electrolyte composition and an electrode layer composition, and forming a solid electrolyte layer and an active material layer, in which the method is a method of manufacturing at least one of a solid electrolyte composition or an electrode layer composition by the method of manufacturing a solid electrolyte composition according to the embodiment of the present invention. In other words, the method is a method of applying (preferably, simultaneously applying multiple layers) a solid electrolyte composition and an electrode layer composition, and forming a solid electrolyte layer and an active material layer, in which the method is a method of manufacturing an all-solid state secondary battery using compositions manufactured by the method of manufacturing at least one of a solid electrolyte composition or an electrode layer composition by the method of manufacturing a solid electrolyte composition according to the embodiment of the present invention.

<Formation of Respective Layers (Film Formation)>

A method of applying each composition generally used for manufacturing a solid electrolyte composition or an all-solid state secondary battery according to the embodiment of the present invention is not particularly limited and can be appropriately selected. A coating method is not particularly limited, and examples thereof include a known coating method such as an extrusion die coater, an air doctor coater, a blade coater, a rod coater, a knife coater, a squeeze coater, a reverse roll coater, a bar coater, a spray coater, a dip coater, a spin coat, and a stripe coat, and the like.

In a case where a film is formed of two or more compositions, a method of sequentially applying and drying (referred to as a method of sequentially applying multiple layers) each composition (slurry) can be adopted as a method of applying these compositions, but, a method of sequentially applying multiple layers in a wet state or a method of simultaneously applying multiple layers is preferable, and a method of simultaneously applying multiple layers is particularly preferable.

Examples of a case where a film is formed of two or more compositions include a case where the positive electrode composition, the solid electrolyte composition, and the negative electrode composition are sequentially applied in the method of manufacturing an all-solid state secondary battery according to the embodiment of the present invention, and furthermore a case where the composition for forming a solid electrolyte layer is applied on the active material layer of the electrode sheet in the above "other methods".

(Method of Sequentially Applying Multiple Layers in Wet State)

A method of sequentially applying multiple layers in a wet state is the same as the method of sequentially applying multiple layers in that respective compositions are applied sequentially, and furthermore the method of sequentially applying multiple layers in a wet state is a method of sequentially applying a predetermined composition before a dispersant in an applied composition is completely evaporated or volatilized (while the composition is maintained in a wet state) on the composition and overlaying the composition in a wet state, and preferably, the overlaid composition is heated and dried. The method of sequentially applying multiple layers in a wet state can be performed by a known method, condition and apparatus, and for example, can be performed with reference to the description in JP2007-083625A.

(Method of Simultaneously Applying Multiple Layers)

A method of simultaneously applying multiple layers is a method of simultaneously applying respective compositions using a coater such as an extrusion die coater, a curtain flow coater, and the like, and preferably the overlaid composition is heated and dried. Herein, the term "simultaneously applying" means, for example, that respective compositions are applied on, for example, a base material in a state of being layered in a predetermined order, and it is not limited to an aspect in which the time or timing of applying the composition on the base material is completely the same. The method of simultaneously applying multiple layers can be performed by a known method, condition and apparatus, and for example, can be performed with reference to the descriptions in JP2005-271283A and JP2006-247967A.

The respective compositions generally used in the Manufacturing of the solid electrolyte composition or all-solid state secondary battery according to the embodiment of the present invention may be dried after being applied by an application method other than the method of sequentially applying multiple layers in a wet state and the method of simultaneously applying multiple layers, and may be dried after applying multiple layers regardless of the application method. The drying temperature is not particularly limited. The lower limit is preferably 30° C. or higher, more preferably 60° C. or higher, even more preferably 80° C. or higher. The upper limit is preferably 300° C. or lower, more preferably 250° C. or lower, and even more preferably 200° C. or lower. The composition is heated at such a temperature range, whereby a dispersion medium can be removed to obtain a solid state (applied and dried layer). Furthermore, it is preferable that the temperature is not too high and each member of the all-solid state secondary battery is not damaged. Thereby, the all-solid state secondary battery can exhibit excellent overall performance and can obtain good binding properties.

In the solid electrolyte composition according to the embodiment of the present invention, deterioration or decomposition of the inorganic solid electrolyte and re-agglomeration or precipitation of the inorganic solid electrolyte and the like as described above can be effectively suppressed even though the composition is applied and dried as described above, and the inorganic solid electrolyte can be maintained in an excellent dispersion state. The excellent dispersion state of a dispersoid can be maintained in the same manner as in a case where the solid electrolyte composition according to the embodiment of the present invention contains an active material and a conductive auxiliary agent.

It is preferable to pressurize the applied solid electrolyte composition or the like of the present invention, or each layer after producing the all-solid state secondary battery or the all-solid state secondary battery. It is also preferable to pressurize each layer in a laminated state. As a pressurization method, a hydraulic cylinder press or the like can be used. Pressurizing force is not particularly limited, and is generally preferably in a range of 50 to 1500 MPa.

The applied solid electrolyte composition or the like may be heated and pressurized simultaneously. The heating temperature is not particularly limited, and is generally in a range of 30° C. to 300° C. Pressing can be performed at a temperature higher than the glass transition temperature of the inorganic solid electrolyte.

Pressurization may be performed in a state where the applied solvent or the dispersion medium is dried in advance, or may be performed in a state where the applied solvent or the dispersion medium remains.

In addition, respective compositions may be applied simultaneously, and application, drying, and press may be performed simultaneously and/or sequentially. The respective compositions are applied to separate base materials, and then may be laminated by transcription.

The atmosphere during pressurization is not particularly limited, and may be in any environment such as in the atmosphere, under the dried air (the dew point: −20° C. or lower), in an inert gas (for example, in an argon gas, in a helium gas, or in a nitrogen gas). Since the inorganic solid electrolyte reacts with moisture, the atmosphere during pressurization is preferably under dried air or in an inert gas.

The pressing time may be a short time (for example, within several hours) at a high pressure or a long time (one day or longer) under the application of an intermediate pressure. In the case of members other than the solid electrolyte-containing sheet, for example, the all-solid state secondary battery, it is also possible to use a restraining device (screw fastening pressure or the like) in order to continuously apply an intermediate pressure.

The pressing pressure may be uniform or different with respect to a pressure-receiving portion such as a sheet surface.

The pressing pressure can be changed depending on the area or film thickness of the portion under pressure. In addition, it is also possible to apply different pressures gradually to the same portion.

A pressing surface may be flat or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state where the pressing pressure is increased and then decreasing the pressure up to a pressure at which the all-solid state secondary battery is ordinarily used.

[Use of All-Solid State Secondary Battery]

The all-solid state secondary battery according to the embodiment of the present invention can be applied to a variety of usages. Application aspects are not particularly limited and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include automobiles (electric cars and the like), electric vehicles, motors, lighting, equipment, toys, game devices, road conditioners, watches, strobes, cameras, medical devices (pacemakers, hearing aids, shoulder massage devices, and the like), and the like. Furthermore, the all-solid state laminated secondary battery can be used for a variety of military usages and universe usages. In addition, the all-solid state laminated secondary battery can also be combined with solar batteries.

EXAMPLES

Hereinafter, the present invention will be described in more detail on the basis of examples. Meanwhile, the present invention is not interpreted to be limited thereto. "Parts" and "%" that represent compositions in the following examples are mass-based unless particularly otherwise described. Furthermore, "-" used in the table means that components in the column are not contained.

<Synthesis Example 1: Synthesis of Sulfide-Based Inorganic Solid Electrolyte Li—P—S-Based Glass>

As a sulfide-based inorganic solid electrolyte, Li—P—S-based glass was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett, (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphoruspentasulfide ($P_2S_5$, manufactured by Aldrich-Sigma, Co. LLC. Purity: >99%) (3.90 g) were respectively weighed, introduced into an agate mortar, and mixed using an agate muddler for five minutes. The mixing ratio between $Li_2S$ and $P_2S_5$ ($Li_2S:P_2S_5$) was set to 75:25 in terms of molar ratio.

66 zirconia beads having a diameter of 5 mm were introduced into a 45 mL zirconia container (manufactured by Fritsch Japan Co., Ltd.), the full amount of the mixture of the lithium sulfide and the diphosphorus pentasulfide was introduced thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, and thereby a yellow powder (6.20 g) of a sulfide-based inorganic solid electrolyte (Li—P—S-based glass) was obtained. The ion conductivity was 0.28 mS/cm. The median diameter of the Li—P—S-based glass measured by the above method was 7.2 μm.

Example 1

A positive electrode composition as an electrode layer composition, a positive electrode sheet for an all-solid state secondary battery, and an all-solid state secondary battery were manufactured respectively, and a battery capacity of this all-solid state secondary battery was measured. In the present example, an effect of improving the battery capacity in an aspect in which the positive electrode active material layer was produced using the solid electrolyte composition of the present invention was confirmed.

Production of Positive Electrode Sheet For All-Solid State Secondary Battery>

—Preparation of Positive Electrode Compositions C-1 to C-19 and D-1 to D-6—

A preliminarily dispersing step in a method of manufacturing a solid electrolyte composition according to the embodiment of the present invention was performed in a dried air environment (the dew point −60° C.) as follows.

That is, 160 zirconia beads having the diameter of 5 mm were introduced into a zirconia 45 mL container (manufactured by Fritsch Japan Co., Ltd.), 2.0 g of the sulfide-based inorganic solid electrolyte Li—P—S-based glass synthesized in Synthesis Example 1 described above and 4.7 mL of the dispersion medium (A) shown in Table 1 were added. Thereafter, the container was set in a planetary ball mill P-7 (manufactured by Fritsch Japan Co., Ltd.), a wet dispersion was performed under the room temperature and at a rotation speed of 350 rpm for 60 minutes, and a preliminary dispersion (slurry 1) of the solid electrolyte and the dispersion medium (A) was prepared. Any of the Li—P—S-based glasses in the slurry 1 had a median diameter of 1.6 μm measured by the above described method.

Next, a step of mixing under the dried air environment was performed. That is, 8.9 g of lithium nickel manganese cobaltate (median diameter: 3 μm) as a positive electrode active material, 0.2 g of acetylene black (median diameter: 0.5 μm) as a conductive auxiliary agent (carbon material), and 9.5 mL of a dispersion medium (A) that is the same as the dispersion medium (A) obtained in the preliminarily dispersing step were added to 4.7 mL of slurry 1 (the content amount of Li—P—S-based glass; 2.0 g) in a zirconia 45 mL container (manufactured by Fritsch Japan Co., Ltd.), the container was set in a planetary ball mill P-7, and a wet dispersion was performed under the room temperature and at a rotation speed of 150 rpm for 10 minutes.

Thus, a positive electrode composition as a non-aqueous composition (slurry, 50% by mass of the concentration of solid contents) was prepared, respectively.

Each of the dispersants used in the preliminarily dispersing step and the mixing step was purified by a conventional method (purity of 99.9% or higher).

—Preparation of Positive Electrode Composition C-20—

A positive electrode composition C-20 was prepared in the same manner as the preparation of the positive electrode composition C-10, except that the preliminarily dispersing step in the preparation of the positive electrode composition C-10 was not performed.

That is, in a dried air environment, 8.9 g of lithium nickel manganese cobaltate (median diameter: 3 μm) as a positive electrode active material, 2.0 g of the sulfide-based inorganic solid electrolyte Li—P—S-based glass synthesized in Synthesis Example 1 described above (median diameter: 7.2 μm), and 0.2 g of acetylene black as a conductive auxiliary agent were mixed, and then added to a planetary mixer (HIVIS MIX 2P-03 (trade name), manufactured by PRIMIX Corporation.). Next, 14.2 mL of the dispersion medium (A) shown in Table 1 as a dispersion medium was added to this planetary mixer, and the mixture was stirred and mixed at 50 rpm for one hour at room temperature to prepare a positive electrode composition as a non-aqueous composition (slurry, 50% by mass of the concentration of solid contents).

—Production of Positive Electrode Sheets For All-Solid State Secondary Battery C-1 to C-20 and D-1 to D-6—

Each of the positive electrode compositions obtained above was applied onto a 20 μm-thick aluminum foil using an applicator (trade name: SA-201 Baker type applicator, manufactured by Tester Sangyo Co., Ltd.) and heated and dried at 100° C. for one hour, thereby producing the positive electrode sheets for an all-solid state secondary battery C-1 to C-20 and D-1 to D-6. The thickness of each of the positive electrode active material layers was 100 μm.

<Evaluation: Evaluation of Battery Capacity>

Each of the produced positive electrode sheets for an all-solid state secondary battery C-1 to C-20 and D-1 to D-6 was punched in a disk-shape having a diameter of 10 mm and placed in a polyethylene terephthalate (PET) cylinder having an inner diameter of 10 mm. 30 mg of the sulfide-based inorganic solid electrolyte Li—P—S-based glass synthesized in Synthesis Example 1 was placed on a surface of the positive electrode active material layer in the cylinder, and a stainless steel (SUS) rod of 10 mmφ was inserted through both end openings of the cylinder. Pressure forming is performed on a substrate (aluminum foil) side of the positive electrode sheet for an all-solid state secondary battery and the sulfide-based inorganic solid electrolyte at a pressure of 350 MPa using the SUS rod to form a solid electrolyte layer. Thereafter, the SUS rod disposed on the solid electrolyte layer side was once removed, and a disc-shaped indium (In) sheet of 9 mmφ (thickness: 20 μm) and a disc-shaped lithium (Li) sheet of 9 mmφ (thickness: 20 μm) were inserted above the solid electrolyte layer in the cylinder in this order. The removed SUS rod was reinserted into the cylinder, and fixed under a pressure of 50 MPA. Thus, all-solid state secondary batteries C-1 to C-20 and D-1 to D-6 including the positive electrode sheets for an all-solid state secondary battery C-1 to C-20 and D-1 to D-6 as positive electrode active material layers were each manufactured, respectively.

The battery capacity of the produced all-solid state secondary battery was measured by a charging and discharging evaluation device (TOSCAT-3000, manufactured by Toyo System Co., Ltd.). Charging was performed at a current density of 0.5 mA/cm$^2$ until a charging voltage reached 3.6 V, and after reaching 3.6 V, charging was performed at a constant voltage until the current density became less than 0.05 mA/cm$^2$. Discharging was performed at a current density of 5 mA/cm$^2$ until reaching 1.9 V. In a case where one cycle is a pair of charging and discharging, three cycles were repeated, and the battery capacity at the third cycle was measured.

It was determined whether the measured battery capacity at the third cycle was included in any of the following regions. The results are shown in Table 1. In this test, an acceptance level of the battery capacity is Evaluation rank "E" or higher.

—Evaluation Rank—

A: 1.0 mAh or higher
B: 0.9 mAh or higher and lower than 1.0 mAh
C: 0.8 mAh or higher and lower than 0.9 mAh
D: 0.7 mAh or higher and lower than 0.8 mAh
E: 0.6 mAh or higher and lower than 0.7 mAh
F: 0.5 mAh or higher and lower than 0.6 mAh
G: lower than 0.5 mAh In Table 1, (A2-1) in the column of "Kind (*)" indicates that the used compound was a ketone compound (A2-1), and (A2-2) indicates that the used compound was an alcohol compound (A2-2). Furthermore, "XXX/YYYY" in the same column and the "Other dispersant" column indicates that the dispersant XXX and the dispersant YYY were used in combination. Furthermore, in the column of "The number of carbon atoms" and the column of "Content ratio" of the positive electrode composition C-18, the number of carbon atoms and the content ratio of 2-DMHO and 4-DMHA are indicated together through "/". Similarly, in the column of "Content ratio" of the positive electrode composition D-5, the content ratio of DBE and NPE are described together through "/".

"-" In Table 1 indicates that the corresponding dispersant was not used.

4-DMHA: 2,6-dimethyl-4-heptanol (functional isomer of DIBK)
DBE: dibutyl ether (eight carbon atoms)
NPE: di(n-propyl) ether (six carbon atoms)

As is clear from Table 1, any of the solid-state secondary batteries D-1 to D-3 produced from the electrode layer composition not containing the dispersion medium (A) defined as a dispersion medium in the present invention have a deteriorated battery capacity. The all-solid state secondary battery D-3 produced from a solid electrolyte composition containing DIBK as a dispersion medium has an improved

TABLE 1

| | Electrode layer composition | | | | | | | | | | |
|---|---|---|---|---|---|---|---|---|---|---|---|
| | Dispersion medium (A) | | | | | | | Other dispersant | | All-solid state secondary battery | |
| | Ketone compound (A1) | | | Dispersant (A2) | | | | | | | |
| No. | Kind | The number of carbon atoms | Content (% by mass) | Kind (*) | The number of carbon atoms | Content ratio (% by mass) | Mass ratio (A1)/(A2) | Kind | Content ratio (% by mass) | No. | Battery capacity | Note |
| D-1 | MEK | 4 | 100 | — | — | — | 100/— | — | — | D-1 | G | Comparative Example |
| C-1 | MEK | 4 | 95 | (A2-1) MIBK | 6 | 5 | 95/5 | — | — | C-1 | E | Example |
| C-2 | MEK | 4 | 95 | (A2-1) DIBK | 9 | 5 | 95/5 | — | — | C-2 | E | Example |
| D-2 | MIBK | 6 | 100 | — | — | — | 100/— | — | — | D-2 | G | Comparative Example |
| C-3 | MIBK | 6 | 95 | (A2-1) MEK | 4 | 5 | 95/5 | — | — | C-3 | D | Example |
| C-4 | MIBK | 6 | 95 | (A2-1) DIBK | 9 | 5 | 95/5 | — | — | C-4 | B | Example |
| C-5 | MIBK | 6 | 95 | (A2-1) 2-DMHO | 9 | 5 | 95/5 | — | — | C-5 | B | Example |
| C-6 | MIBK | 6 | 95 | (A2-2) 4-MPA | 6 | 5 | 95/5 | — | — | C-6 | E | Example |
| C-7 | MIBK | 6 | 95 | (A2-2) 4-DMHA | 9 | 5 | 95/5 | — | — | C-7 | D | Example |
| D-3 | DIBK | 9 | 100 | — | — | — | 100/— | — | — | D-3 | F | Comparative Example |
| C-8 | DIBK | 9 | 95 | (A2-1) MEK | 4 | 5 | 95/5 | — | — | C-8 | C | Example |
| C-9 | DIBK | 9 | 95 | (A2-1) MIBK | 6 | 5 | 95/5 | — | — | C-9 | B | Example |
| C-10 | DIBK | 9 | 95 | (A2-1) 2-DMHO | 9 | 5 | 95/5 | — | — | C-10 | A | Example |
| C-11 | DIBK | 9 | 95 | (A2-2) 4-MPA | 6 | 5 | 95/5 | — | — | C-11 | B | Example |
| C-12 | DIBK | 9 | 95 | (A2-2) 4-DMHA | 9 | 5 | 95/5 | — | — | C-12 | B | Example |
| C-13 | DIBK | 9 | 99 | (A2-1) 2-DMHO | 9 | 1 | 99/1 | — | — | C-13 | D | Example |
| C-14 | DIBK | 9 | 98 | (A2-1) 2-DMHO | 9 | 2 | 98/1 | — | — | C-14 | A | Example |
| C-10 | DIBK | 9 | 95 | (A2-1) 2-DMHO | 9 | 5 | 95/5 | — | — | C-10 | A | Example |
| C-15 | DIBK | 9 | 85 | (A2-1) 2-DMHO | 9 | 15 | 85/15 | — | — | C-15 | B | Example |
| C-16 | DIBK | 9 | 70 | (A2-1) 2-DMHO | 9 | 30 | 70/30 | — | — | C-16 | D | Example |
| C-17 | DIBK | 9 | 50 | (A2-1) 2-DMHO | 9 | 50 | 50/50 | — | — | C-17 | E | Example |
| C-18 | DIBK | 9 | 95 | (A2-1) 2-DMHO/ (A2-2) 4-DMDA | 9/9 | 2.5/2.5 | 95/5 | — | — | C-18 | A | Example |
| C-19 | DIBK | 9 | 70.8 | (A2-1) 2-DMHO | 9/9 | 12.5 | 85/15 | Heptane | 16.7 | C-19 | A | Example |
| C-20 | DIBK | 9 | 95 | (A2-1) 2-DMHO | 9/9 | 50 | 95/5 | — | — | C-20 | C | Example |
| D-4 | — | — | — | — | — | — | — | DBE | 100 | D-4 | Unmeasurable | Comparative Example |
| D-5 | — | — | — | — | — | — | — | DBE/NPE | 95/5 | D-5 | Unmeasurable | Comparative Example |
| D-6 | DIBK | 9 | 23 | — | — | — | — | Heptane | 77 | D-6 | G | Comparative Example |

<Notes in Table>
MEK: Methyl ethyl ketone
MIBK: Methyl isobutyl ketone
DIBK: diisobutyl ketone
4-MPA: 4-methyl-2-pentanol (functional isomer of MIBK)
2-DMHO: 4,6-dimethyl-2-heptanone (positional isomer of DIBK)

battery capacity, but still does not reach the acceptance level set in the present invention, and there is room for improvement.

Furthermore, in any of the all-solid state secondary battery D-4 produced from a solid electrolyte composition containing dibutyl ether as a dispersion medium described in Patent Documents 1 and 3, and the all-solid secondary battery D-5 produced from a solid electrolyte composition containing dibutyl ether and di(n-propyl) ether, the battery capacity could not be measured. This is considered to be because the sulfide-based inorganic solid electrolyte is deteriorated or decomposed.

Furthermore, the all-solid state secondary battery D-6 produced from a solid electrolyte composition containing DIBK and heptane as a dispersion medium has a deteriorated battery capacity.

On the other hand, any of the all-solid state secondary batteries C-1 to C-20 produced from an electrode layer composition containing the dispersion medium (A) defined as a dispersion medium in the present invention have a higher battery capacity than comparative all-solid state secondary batteries, specifically the all-solid state secondary battery D-3 having a relatively high battery capacity.

Specifically, in a case where MEK is used as the ketone compound (A1), it is found that a battery capacity is improved by using the ketone compound (A1) as a dispersant (A2) and a ketone compound (A2-1) having a chemical structure different from the ketone compound (A1), particularly a ketone compound having 6 or more carbon atoms, in combination. In addition, in a case Where MIBK, and DIBK having 6 or more carbon atoms is used as the ketone compound (A1), it is found that a battery capacity is improved by using a ketone compound (A2-1) having 4 or more carbon atoms and a different chemical structure from the ketone compound (A1) as a dispersant (A2), in combination. Particularly, according to an increase in the number of carbon atoms of the ketone compound (A2-1), for example, in a case where the number of carbon atoms is 6 or more, and more preferably 9 or more, it is found that a battery capacity is more effectively improved.

It is found that the same effect of improving the battery capacity is exhibited in a case of using the alcohol compound (A2-2) as a dispersant (A2) and furthermore even in a case of using the ketone compound (A2-1) and the alcohol compound (A2-2) in combination.

Furthermore, in a case where the content ratio of the dispersant (A2) in the dispersion medium (A) is in a range of less than 50% by mass, particularly 2% to 5% by mass (a mass ratio [content ratio of ketone compound (A1)/content ratio of dispersant (A2)] is within a range of 95/5 to 98/2), the battery capacity can be improved up to a higher level.

The all-solid state secondary battery C-19 is produced from an electrode layer composition containing heptane as another dispersant in addition to the ketone compound (A1) and the dispersant (A2) as a dispersion medium also has an excellent battery capacity.

It is found that the electrode layer composition C-10 prepared by performing the step of preliminarily dispersing the sulfide-based inorganic solid electrolyte can provide a higher battery capacity to an all-solid state secondary battery than the electrode layer composition C-20 prepared without the preliminarily dispersing step. This is considered to be because the sulfide-based inorganic solid electrolyte was crushed and refined in the preliminarily dispersing step.

Example 2

A positive electrode composition, a positive electrode sheet for an all-solid state secondary battery, and an all-solid state secondary battery were manufactured respectively, and dispersion stability of the positive electrode composition and a battery capacity of the all-solid state secondary battery were measured. In the present example, an effect of improving the battery capacity in an aspect in which the positive electrode active material layer was produced using the solid electrolyte composition of the present invention was confirmed.

<Preparation of Positive Electrode Compositions E-1A and E-1B>

Positive electrode compositions E-1A and E-1B were prepared in the same manner as the positive electrode compositions D-3 and C-10 of Example 1, respectively.

The positive electrode compositions E-2A and E-2B were prepared in the same manner as the positive electrode compositions E-1A and E-1B except that $Li_7La_3Zr_2O_{12}$ (median diameter: 5 µm, manufactured by TOSHIMA MANUFACTURING CO., LTD.) was used as a solid electrolyte instead of Li—P—S-based glass.

That is, 160 zirconia beads having the diameter of 5 mm were introduced into a zirconia 45 mL container (manufactured by Fritsch Japan Co., Ltd.), and 2.0 g of $Li_7La_3Zr_2O_{12}$ (manufactured by TOSHIMA MANUFACTURING CO., LTD.) and 4.7 mL of the dispersion medium (A) shown in Table 2 were added. Thereafter, the container was set in a planetary ball mill P-7 (manufactured by Fritsch Japan Co., Ltd.), a wet dispersion was performed under the room temperature and at a rotation speed of 350 rpm for 60 minutes, and a preliminary dispersion (slurry 2) of the solid electrolyte (median diameter: 1.8 µm) and the dispersion medium (A) was prepared.

Next, a step of mixing under the dried air environment was performed. That is, 8.9 g of lithium nickel manganese cobaltate (median diameter: 3 µm) as a positive electrode active material, 0.2 g of acetylene black (median diameter: 0.5 µm) as a conductive auxiliary agent (carbon material), and 9.5 mL of a dispersion medium (A) that is the same as the dispersion medium (A) obtained in the preliminarily dispersing step were added to 4.7 mL of slurry 2 (the content amount of $Li_7La_3Zr_2O_{12}$: 2.0 g) in a zirconia 45 mL container (manufactured by Fritsch Japan Co., Ltd.), the container was set in a planetary ball mill P-7, and a wet dispersion was performed under the room temperature and at a rotation speed of 150 rpm for 10 minutes.

Thus, positive electrode compositions E-2A and E-2B as a non-aqueous composition (slurry, 50% by mass of the concentration of solid contents) were prepared, respectively.

<Evaluation 1: Evaluation of Battery Capacity>

A positive electrode sheet for an all-solid state secondary battery and an all-solid state secondary battery were produced or manufactured using each of the prepared positive electrode compositions in the same manner as in Example 1, respectively.

A battery capacity was evaluated using the manufactured all-solid state secondary batteries E-1A, E-1B, E-2A, and E-2B in the same manner as in <Evaluation: Evaluation of battery capacity> of Example 1. The results are shown in Table 2.

<Evaluation 2: Evaluation of Dispersion Stability>

Dispersibility (dispersion stability) of solid particles (an inorganic solid electrolyte, an active material and a conductive auxiliary agent) was evaluated with respect to the prepared positive electrode compositions E-1A, E-1B, E-2A and E-2B.

Each positive electrode composition was put in a precipitation tube having an inner diameter of 5 mm and left to stand at 25° C. for 60 minutes, and then a distance to an interface between the positive electrode composition (slurry) and the separated clarified portion (supernatant) was measured. Specifically, in a case where the distance from a bottom surface of the precipitation tube to a surface of a clarified layer (a surface of the introduced positive electrode composition) is 100, the distance from the bottom surface to the interface is calculated as a percentage, and the evaluation was made based on which of the following evaluation criteria were met. The results are shown in Table 1. In this test, an acceptance level of the dispersion stability is Evaluation rank "B" or higher.

—Evaluation Rank—
A: 95% or higher, 100% or lower
B: 90% or higher and lower than 95%
C: 85% or higher and lower than 90%
D: 80% or higher and lower than 85%
E: lower than 80%

Example 3

A solid electrolyte composition, a solid electrolyte-containing sheet for an all-solid state secondary battery, and an all-solid state secondary battery were manufactured respectively, and dispersion stability of the solid electrolyte composition and a battery capacity of the all-solid state secondary battery were measured. In the present example, an effect of improving the battery capacity in an aspect in which the solid electrolyte layer was produced using the solid electrolyte composition of the present invention was confirmed.

<Preparation of Solid Electrolyte Compositions E-3A and E-3B>

160 zirconia beads having the diameter of 5 mm, 2.0 g of the solid electrolyte shown in Table 2 (synthesized in Synthesis Example 1), and 4.7 mL of the dispersion medium (A) shown in Table 2 were introduced into a zirconia 45 mL container (manufactured by Fritsch Japan Co., Ltd.). The container was set in a planetary ball mill P-7 (trade name) manufactured by Fritsch Japan Co., Ltd., a wet dispersion was performed at a temperature of 25° C. and a rotation speed of 350 rpm for 60 minutes, and solid electrolyte compositions E-3A and E3B (35% by mass of the concentration of solid contents) as non-aqueous compositions are prepared, respectively.

<Production of Solid Electrolyte Sheets For All-Solid State Secondary Battery E-3A and E-3B>

Each of the produced solid electrolyte compositions was applied on an Al foil using an applicator (trade name: SA-201 Baker type applicator, manufactured by Tester Sangyo Co., Ltd.) so as to have a basis weight of 38 mg/cm$^2$, and heated and dried at 100'C for one hour, thereby producing solid electrolyte sheets for an all-solid state secondary battery E-3A and E-3B having solid electrolyte layers on the Al foils. The thickness of each of the solid electrolyte layer was 250 μm.

<Evaluation 1: Evaluation of Battery Capacity>

Each of the produced solid electrolyte sheets for an all-solid state secondary battery E-3A and E-3B was punched in a disk-shape having a diameter of 10 mm and placed in a polyethylene terephthalate (PET) cylinder having an inner diameter of 10 mm. The positive electrode sheet for an all-solid state secondary battery D-3 synthesized in Example 1 was placed on a surface of the solid electrolyte layer in the cylinder (the positive electrode active material layer of the positive electrode sheet for an all-solid state secondary battery D-3 have been brought into contact with the solid electrolyte layer of the solid electrolyte sheet for an all-solid state secondary battery), and a stainless steel (SUS) rod having a diameter of 10 mm was inserted through both end openings of the cylinder. Pressure forming is performed on a substrate (aluminum foil) side of the positive electrode sheet for an all-solid state secondary battery and the solid electrolyte layer side at a pressure of 350 MPa using the SUS rod to form a laminate formed with the positive electrode active material layer and the solid electrolyte layer. Thereafter, the SUS rod disposed on the solid electrolyte layer side was once removed, the Al foil of the solid electrolyte sheet is gently peeled off, and then a disc-shaped indium (In) sheet of 9 mmφ (thickness: 20 μm) and a disc-shaped lithium (Li) sheet of 9 mmφ (thickness: 20 μm) were inserted above the solid electrolyte layer in the cylinder in this order. The removed SUS rod was reinserted into the cylinder, and fixed under a pressure of 50 MPa. Thus, the all-solid state secondary batteries E-3A and E-3B each having the solid electrolyte sheets for an all-solid state secondary battery E-3A or E-3B were manufactured.

<Evaluation 1: Evaluation of Battery Capacity>

A battery capacity was evaluated using each of the manufactured all-solid state secondary batteries in the same mariner as in <Evaluation: Evaluation of battery capacity> of Example 1. The results are shown in Table 2.

<Evaluation 2: Evaluation of Dispersion Stability>

Dispersibility (dispersion stability) of solid particles (inorganic solid electrolyte) was evaluated using each of the prepared solid electrolyte compositions in the same manner as in <Evaluation 2: Evaluation of Dispersion Stability> of Example 2. The results are shown in Table 2.

Example 4

A negative electrode composition, a negative electrode sheet for an all-solid state secondary battery, and an all-solid state secondary battery were manufactured respectively, and dispersion stability of the solid electrolyte composition and a battery capacity of the all-solid state secondary battery were measured. In the present example, an effect of improving the battery capacity in an aspect in which the negative electrode active material layer was produced using the solid electrolyte composition of the present invention was confirmed.

<Preparation of Negative Electrode Compositions E-4A and E-4B>

160 zirconia beads having the diameter of 5 mm, 2.0 g of the solid electrolyte shown in Table 2 (synthesized in Synthesis Example 1), and 4.7 mL of the dispersion medium (A) shown in Table 2 were introduced into a zirconia 45 mL container (manufactured by Fritsch Japan Co., Ltd.). The container was set in a planetary ball mill P-7 (trade name), preliminarily dispersing was performed at a temperature of 25° C. and at a rotation speed of 350 rpm for 60 minutes, and a preliminary dispersion (slurry 3) of the solid electrolyte (median diameter: 1.6 μm) and the dispersion medium (A) was prepared.

Next, a step of mixing under the dried air environment was performed. That is, 5.0 g of graphite: CGB20 (trade name, median diameter: 20 μm, manufactured by Nippon Graphite Co., Ltd.) was introduced into the container (mixed with slurry 3) as the negative electrode active material, and the container was set again in a planetary ball mill P-7, mixing was continued under the room temperature at 200 rpm for 15 minutes to prepare negative electrode compositions E-4A and E-4B as a non-aqueous composition, respectively (50% by mass of the concentration of solid contents).

<Production of Negative Electrode Sheets For All-Solid State Secondary Battery E-4A and E-4B>

Each of the prepared negative electrode compositions was applied on a SUS foil (a negative electrode collector) by an applicator (trade name: SA-201 Baker type applicator, manufactured by Tester Sangyo Co., Ltd.) so as to have a basis weight of 15 mg/cm$^2$, and heated and dried at 100° C.

for one hour, thereby producing negative electrode sheets for an all-solid state secondary battery E-4A and E-4B having negative electrode active material layers on the negative electrode collectors. The thickness of each of the negative electrode active material layers was 80 μm.

<Manufacturing of All-Solid Secondary Batteries E-4A and E-4B>

Each of the produced negative electrode sheets for an all-solid state secondary battery was punched in a disk-shape having a diameter of 10 mm and placed in a polyethylene terephthalate (PET) cylinder having an inner diameter of 10 mm. 30 mg of the sulfide-based inorganic solid electrolyte Li—P—S-based glass synthesized in Synthesis Example 1 was placed on a surface of the negative electrode active material layer in the cylinder, and a stainless steel (SUS) rod having a diameter of 10 mm was inserted through both end openings of the cylinder. Pressure forming is performed on a negative electrode collector side of the negative electrode sheet for an all-solid state secondary battery and the sulfide-based inorganic solid electrolyte at a pressure of 350 MPa using the SUS rod to form a solid electrolyte layer. Thereafter, the SUS rod disposed on the solid electrolyte layer side was once removed, and a disc-shaped indium (In) sheet of 9 mmφ (thickness: 20 μm) and a disc-shaped lithium (Li) sheet of 9 mmφ (thickness: 20 μm) were inserted above the solid electrolyte layer in the cylinder in this order. The removed SUS rod was reinserted into the cylinder, and fixed under a pressure of 50 MPa. Thus, the all-solid secondary batteries E-4A and E-4B were manufactured as all-solid state secondary batteries for the negative electrode evaluation, respectively.

<Evaluation 1: Evaluation of Battery Capacity>

A battery capacity was evaluated using each of the manufactured all-solid state secondary batteries in the same manner as in <Evaluation: Evaluation of battery capacity> of Example 1. The results are shown in Table 2.

<Evaluation 2: Evaluation of Dispersion Stability>

Dispersibility (dispersion stability) of solid particles (inorganic solid electrolyte and negative electrode active material) was evaluated using each of the prepared negative electrode compositions in the same manner as in <Evaluation 2: Evaluation of dispersion stability> of Example 2. The results are shown in Table 2.

<Notes in Table>
LPS: Li—P—S-based glass (sulfide-based inorganic solid electrolyte)
LLZ: $Li_7La_3Zr_2O_{12}$ (oxide-based inorganic solid electrolyte)
CGB20: graphite (granular) (negative electrode active material)
NMC: Lithium nickel manganese cobalt oxide (positive electrode active material)
AB: acetylene black (conductive auxiliary agent)

In Table 2, the dispersion medium (A) number is the same as the positive electrode composition number using, the dispersion medium (A) in Example 1. For example, "C-10" in the column of the dispersion medium (A) indicates the dispersion medium (A) used for the positive electrode composition C-10 in Example 1. The unit of "Content ratio" in the column of the dispersion medium (A) is % by mass.

In Examples 2 to 4, the dispersion stability in a case of using the dispersion medium C-10 used for the positive electrode composition C-10 from which a high battery capacity is obtained in Example 1 and the dispersion medium D-3 used for the positive electrode composition D-3 in Comparative Example 3 was evaluated with respect to respective compositions.

As a result, as is clear from Table 2, it is found that in a case of using the dispersion medium D-3, any of the solid electrolyte composition (E-3A), the positive electrode compositions (E-1A and E-2A), and the negative electrode composition (E-4A) do not exhibit sufficient dispersion stability. On the other hand, in a case of using the dispersion medium (A) defined in the present invention, all of the solid electrolyte composition (E-3B), the positive electrode compositions (E-1B and E-2B), and the negative electrode composition (E-4B) exhibit high dispersion stability.

In addition, all of the all-solid state secondary batteries manufactured using the respective compositions (E-1A to E-4A) containing the dispersion medium D-3 have the deteriorated battery capacity. On the other hand, all of the all the solid-state secondary batteries manufactured using the respective compositions (B-1B to E-4B) containing the dispersion medium (A) defined in the present invention have the more higher battery capacity.

TABLE 2

| Composition No. | Solid particles used in respective compositions | | | Dispersion medium (A) | | | | | Evaluation | | Note |
| | Inorganic solid electrolyte | Active material | Conductive auxiliary agent | Ketone compound (A1) | | | Dispersant (A2) | | | | |
| | | | | No. | Kind | Content ratio | Kind | Content ratio | Dispersion stability | Battery capacity | |
| E-1A | LPS | NMC | AB | D-3 | DIBK | 100 | — | — | E | F | Comparative Example |
| E-1B | LPS | NMC | AB | C-10 | DIBK | 95 | (A2-1) 2-DMHO | 5 | A | A | Example |
| F-2A | LLZ | NMC | AB | D-3 | DIBK | 100 | — | — | E | G | Comparative Example |
| E-2B | LLZ | NMC | AB | C-10 | DIBK | 95 | (A2-1) 2-DMHO | 5 | A | C | Example |
| E-3A | LPS | — | — | D-3 | DIBK | 100 | — | — | D | F | Comparative Example |
| E-3B | LPS | — | — | C-10 | DIBK | 95 | (A2-1) 2-DMHO | 5 | A | D | Example |
| E-4A | LPS | CGB20 | — | D-3 | DIBK | 100 | — | — | D | F | Comparative Example |
| E-4B | LPS | CGB20 | — | C-10 | DIBK | 95 | (A2-1) 2-DMHO | 5 | A | B | Example |

The results of the dispersion stability and the battery capacity were the same as in a case of using the sulfide-based inorganic solid electrolyte or a case of using the oxide-based inorganic solid electrolyte as the inorganic solid electrolyte (Example 2).

Example 5

In Example 5, a positive electrode composition, a solid electrolyte composition, and a negative electrode composition were applied by a method of simultaneously applying multiple layers, a laminate formed with an aluminum foil, a positive electrode active material layer, a solid electrolyte layer, and a negative electrode active material layer, and an all-solid state secondary battery using the laminate were manufactured, respectively, and a battery capacity of the obtained all-solid state secondary battery was measured. In the present example, an effect of improving the battery capacity in an aspect in which the positive electrode active material layer, the solid electrolyte layer, and the negative electrode active material layer were produced using the solid electrolyte composition of the present invention by a method of simultaneously applying multiple layers was confirmed. The results are shown in Table 3.

<Production of Laminate Formed With Aluminum Foil, Positive Electrode Active Material Layer, Solid Electrolyte Layer, and Negative Electrode Active Material Layer>

That is, the positive electrode composition E-1B, the solid electrolyte composition E-3B, and the negative electrode composition E-4B prepared in Examples 2 and 3 were simultaneously applied for multilayer coating on an aluminum support: AlN30-H (trade name, manufactured by UACJ Corporation, thickness: 20 μm, and width: 200 mm) using a smart laboratory coater (manufactured by Techno Smart Corp.) in order from the aluminum support side so that a basis weight of the positive electrode active material layer is 22 mg/cm$^2$, a basis weight of the solid electrolyte layer was 6 mg/cm$^2$, and a basis weight of the negative electrode active material layer is 15 mg/cm$^2$, respectively, and then dried in a dryer at 150° C. for 3 minutes. The above resulting product was pressurized at 20 MPa and then wound up to produce a laminate formed with an aluminum foil, a positive electrode active material layer, a solid electrolyte layer, and a negative electrode active material layer.

<Manufacturing of All-Solid State Secondary Battery>

The produced laminate was punched in a disk-shape having a diameter of 10 mm and placed in a polyethylene terephthalate (PET) cylinder having an inner diameter of 10 mm. A stainless steel (SUS) rod having a diameter of 10 mm was inserted through both end openings of the cylinder, pressure forming is performed on the laminate at 350 MPa, and then the laminate is fixed under a pressure of 50 MPa. Thus, an all-solid state secondary battery of Example 5 was manufactured.

Example 6

In Example 6, a positive electrode active material layer, a solid electrolyte layer, and a negative electrode active material layer were sequentially formed by a method of sequentially applying multiple layers to manufacture an all-solid state secondary battery, and a battery capacity of the obtained all-solid state secondary battery was measured. In the present example, an effect of improving the battery capacity in an aspect in which the positive electrode active material layer, the solid electrolyte layer, and the negative electrode active material layer were produced using the solid electrolyte composition of the present invention by a method of sequentially applying multiple layers was confirmed. The results are shown in Table 3.

That is, in Example 5, the positive electrode active material layer, the solid electrolyte layer, and the negative electrode active material layer were formed using a positive electrode composition, a solid electrolyte composition, and a negative electrode composition by the method of sequentially applying multiple layers instead of the method of simultaneously applying multiple layers, respectively. Specifically, the positive electrode active material layer was formed by applying and drying the positive electrode composition E1B on an aluminum support: AlN30-H, the solid electrolyte layer was then formed by applying and drying the solid electrolyte composition E-3B on the positive electrode active material layer, and furthermore the negative electrode active material layer was formed by applying and drying the negative electrode composition E-4B. Thus, a laminate formed with the aluminum foil, the positive electrode active material layer, the solid electrolyte layer, and the negative electrode active material layer is produced. The applying conditions for respective compositions were the same as in Example 5. An all-solid state secondary battery was manufactured in the same manner as in Example 5, except that the produced laminate was used.

<Evaluation: Evaluation of Battery Capacity>

A battery capacity was evaluated using the respective all-solid state secondary batteries manufactured in Example 5 and Example 6 in the same manner except that a charging voltage was changed from 3.6 V to 4.2 V, and a discharging voltage was changed from 1.9 V to 2.5 Vin <Evaluation: Evaluation of Battery Capacity> of Example 1. The results are shown in Table 3.

TABLE 3

| | Positive electrode composition | Solid electrolyte composition | Negative electrode composition | Application method | Battery capacity |
|---|---|---|---|---|---|
| Example 5 | E-1B | E-3B | E-4B | Simultaneously applying multiple layers | A |
| Example 6 | E-1B | E-3B | E-4B | Sequentially applying multiple layers | B |

As is clear from the results shown in Table 3, it is found that the all-solid state secondary battery (Example 5) including the laminate produced by applying respective compositions using the method of simultaneously applying multiple layers has a more improved battery capacity than the all-solid state secondary battery (Example 6) including the laminate produced by performing film formation using the respective compositions separately by the method of sequentially applying multiple layers. This is considered to be because contact areas between the positive electrode active material layer and the solid electrolyte layer (interface) and between the solid electrolyte layer and the negative electrode active material layer are increased by applying multiple layers simultaneously.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

The present application claims priority on the basis of JP2018-018676A filed on Feb. 5, 2018, JP2018-098992A filed on May 23, 2018, in Japan, the entire contents of which are incorporated as a part of the present application by reference.

Explanation of References

1: negative electrode collector
2: negative electrode active material layer
3: solid electrolyte layer
4: positive electrode active material layer
5: positive electrode collector
6: operation portion
10: all-solid state secondary battery

What is claimed is:

1. A solid electrolyte composition comprising:
an inorganic solid electrolyte; and
a dispersion medium (A), wherein the dispersion medium (A) includes a ketone compound (A1), and at least one dispersant (A2) selected from a ketone compound (A2-1) having a chemical structure different from the ketone compound (A1) or an alcohol compound (A2-2), the ketone compound (A1) has 6 or more carbon atoms, the ketone compound (A2-1) has 6 or more carbon atoms, and the alcohol compound (A2-2) has 6 or more carbon atoms.

2. The solid electrolyte composition according to claim 1, further comprising an active material.

3. The solid electrolyte composition according to claim 1, further comprising a conductive auxiliary agent.

4. The solid electrolyte composition according to claim 1, wherein a content ratio of the dispersant (A2) in the dispersion medium (A) is more than 0% by mass and less than 50% by mass.

5. The solid electrolyte composition according to claim 1, wherein the ketone compound (A2-1) has 9 or more carbon atoms.

6. The solid electrolyte composition according to claim 1, wherein at least one dispersant (A2) is a structural isomer of the ketone compound (A1).

7. The solid electrolyte composition according to claim 1, wherein the dispersion medium (A) includes at least one non-polar dispersant.

8. The solid electrolyte composition according to claim 1, wherein a median diameter of an active material is larger than a median diameter of the inorganic solid electrolyte.

9. A solid electrolyte-containing sheet having a layer formed of the solid electrolyte composition according to claim 1.

10. A method of manufacturing a solid electrolyte composition comprising:
a step of dispersing an inorganic solid electrolyte in a dispersion medium (A),
wherein the dispersion medium (A) includes a ketone compound (A1), and at least one dispersant (A2) selected from a ketone compound (A2-1) having a chemical structure different from the ketone compound (A1) or an alcohol compound (A2-2), the ketone compound (A1) has 6 or more carbon atoms, the ketone compound (A2-1) has 6 or more carbon atoms, and the alcohol compound (A2-2) has 6 or more carbon atoms.

11. The method of manufacturing a solid electrolyte composition according to claim 10, wherein a content ratio of the dispersant (A2) in the dispersion medium (A) is more than 0% by mass and less than 50% by mass.

12. The method of manufacturing a solid electrolyte composition according to claim 10, wherein the ketone compound (A2-1) has 9 or more carbon atoms.

13. The method of manufacturing a solid electrolyte composition according to claim 10, wherein at least one dispersant (A2) is a structural isomer of the ketone compound (A1).

14. The method of manufacturing a solid electrolyte composition according to claim 10, wherein the dispersion medium (A) includes at least one non-polar dispersant.

15. The method of manufacturing a solid electrolyte composition according to claim 10, further comprising a step of mixing an active material and a preliminary dispersion obtained after the dispersing step.

16. The method of manufacturing a solid electrolyte composition according to claim 15, wherein the mixing step is a step of mixing the preliminary dispersion, the active material, and a conductive auxiliary agent.

17. A method of manufacturing an electrode sheet for an all-solid state secondary battery comprising the method of manufacturing a solid electrolyte composition according to claim 10.

18. A method of manufacturing an all-solid state secondary battery comprising the method of manufacturing a solid electrolyte composition according to claim 10.

19. The method of manufacturing an all-solid state secondary battery according to claim 18, wherein a solid electrolyte composition and a solid electrolyte composition containing an active material are simultaneously applied for multi-layer coating to form a solid electrolyte layer and an active material layer, and
at least one of the solid electrolyte composition or the solid electrolyte composition containing the active material is manufactured by a method of manufacturing a solid electrolyte composition comprising:
a step of dispersing an inorganic solid electrolyte in a dispersion medium (A),
wherein the dispersion medium (A) includes a ketone compound (A1), and at least one dispersant (A2) selected from a ketone compound (A2-1) having a chemical structure different from the ketone compound (A1) or an alcohol compound (A2-2), the ketone compound (A1) has 6 or more carbon atoms, the ketone compound (A2-1) has 6 or more carbon atoms, and the alcohol compound (A2-2) has 6 or more carbon atoms.

* * * * *